US012658199B2

(12) United States Patent
Fang et al.

(10) Patent No.: US 12,658,199 B2
(45) Date of Patent: Jun. 16, 2026

(54) TRAINING METHOD AND ENHANCEMENT METHOD FOR SPEECH ENHANCEMENT MODEL, APPARATUS, ELECTRONIC DEVICE, STORAGE MEDIUM AND PROGRAM PRODUCT

(71) Applicant: Tencent Technology (Shenzhen) Company Limited, Shenzhen (CN)

(72) Inventors: Xuefei Fang, Shenzhen (CN); Dong Yang, Shenzhen (CN); Muyong Cao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 179 days.

(21) Appl. No.: 18/582,989

(22) Filed: Feb. 21, 2024

(65) Prior Publication Data

US 2024/0194214 A1 Jun. 13, 2024

Related U.S. Application Data

(63) Continuation of application No. PCT/CN2023/096246, filed on May 25, 2023.

(30) Foreign Application Priority Data

Aug. 1, 2022 (CN) .......................... 202210917051.5

(51) Int. Cl.
*G10L 21/0324* (2013.01)
*G10L 15/22* (2006.01)
(Continued)

(52) U.S. Cl.
CPC .......... *G10L 21/0324* (2013.01); *G10L 15/22* (2013.01); *G10L 21/0208* (2013.01); *G10L 21/0316* (2013.01)

(58) Field of Classification Search
CPC ............ G10L 21/0324; G10L 21/0208; G10L 2021/02165; G10L 21/0316;
(Continued)

(56) References Cited

U.S. PATENT DOCUMENTS 9,626,987 B2 * 4/2017 Matsuo ............... G10L 21/0232
10,510,358 B1 * 12/2019 Barra-Chicote ........ G10L 13/02
(Continued)

FOREIGN PATENT DOCUMENTS

CN 102169694 A 8/2011
CN 113436643 A 9/2021
(Continued)

OTHER PUBLICATIONS

Sep. 18, 2023—(WO) Search Report—App PCT/CN2023/096246.
(Continued)

*Primary Examiner* — Vijay B Chawan
(74) *Attorney, Agent, or Firm* — Banner & Witcoff, Ltd.

(57) ABSTRACT

A training method and an enhancement method for a speech enhancement model, an apparatus, an electronic device, a storage medium, and a program product are described. A training method for the model may include: invoking the model based on a noisy speech feature of a speech signal, to obtain first predicted mask values in an auditory domain. A first amplitude and first phase of the noisy speech signal, and a second amplitude and second phase of a clean speech signal may then be obtained. A phase difference at each frequency point may be determined based on the phases. The second amplitude corresponding to each frequency point may be corrected based on the phase difference at each frequency point, to obtain a corrected second amplitude corresponding to each frequency point. A loss value is determined, and parameters of the speech enhancement model may be updated based on the loss value.

19 Claims, 10 Drawing Sheets

Training system 100 of a speech enhancement model

Server 200

Noisy speech signal of the game client/conference client/ livestreaming client/instant voice communication client Enhanced speech signal of the game client/conference client/ livestreaming client/instant voice communication client Network 300

Noisy speech signal of a game client/a conference client/a livestreaming client/an instant voice communication client Enhanced speech signal of the game client/conference client/ livestreaming client/instant voice communication client Human-computer interaction interface Human-computer interaction interface Play the enhanced speech signal of the game client/ conference client/ livestreaming client/instant voice communication client in a human-computer interaction interface Terminal 401

Terminal 402

(51) Int. Cl.
| | |
|---|---|
| *G10L 21/0208* | (2013.01) |
| *G10L 21/0316* | (2013.01) |

(58) Field of Classification Search
CPC ..... G10L 21/0364; G10L 19/04; G10L 15/22; G10L 15/08; G10L 15/063; G10L 21/038; G10L 21/02; G10L 2021/02087
USPC ........................................................ 704/278
See application file for complete search history.

(56) References Cited

U.S. PATENT DOCUMENTS

| | | | | |
|---|---|---|---|---|
| 11,056,130 | B2 * | 7/2021 | Zhu ..................... | G10L 21/0208 |
| 11,894,011 | B2 * | 2/2024 | McCallum ........... | G10L 19/018 |
| 12,217,766 | B2 * | 2/2025 | McCallum .......... | G10L 21/0232 |
| 2010/0246851 | A1 * | 9/2010 | Buck ................... | G10L 21/0208 |
| | | | | 381/94.1 |
| 2010/0323652 | A1 * | 12/2010 | Visser ................... | H04R 3/005 |
| | | | | 455/232.1 |
| 2013/0136271 | A1 * | 5/2013 | Buck ................... | G10L 21/0208 |
| | | | | 381/71.11 |
| 2014/0149111 | A1 * | 5/2014 | Matsuo ............... | G10L 21/0232 |
| | | | | 704/206 |
| 2020/0265857 | A1 * | 8/2020 | Zhu ..................... | G10L 21/0364 |
| 2021/0201928 | A1 * | 7/2021 | Rao ..................... | G10L 21/0224 |
| 2022/0150627 | A1 * | 5/2022 | Zhou ..................... | H04R 3/002 |
| 2022/0291328 | A1 * | 9/2022 | Ozturk .................. | G01S 5/0226 |
| 2023/0097520 | A1 * | 3/2023 | Xiao ....................... | G10L 13/02 |
| | | | | 704/200 |
| 2024/0194214 | A1 * | 6/2024 | Fang ................... | G10L 21/0324 |

FOREIGN PATENT DOCUMENTS

| | | |
|---|---|---|
| CN | 110600017 B | 3/2022 |
| CN | 114974299 A | 8/2022 |
| WO | 2022012195 A1 | 1/2022 |

OTHER PUBLICATIONS

Zheng, Li et al., "Two-stage speech enhancement algorithm based on time-frequency mask optimization", Electronic Design Engineering, vol. 30, No. 4, Feb. 2022, p. 17-21.

Erdogan, H. et al., "Phase Sensitive and Recognition-Boosted Speech Separation Using Deep Recurrent Neural Networks," Mitsubishi Electric Research Laboratories, Apr. 2015, 7 pages.

Jamal, Norezmi et al., "Binary Time-Frequency Mask for Improved Malay Speech Intelligibility at Low SNR Condition," 2020 IOP Conference Series: Materials Science and Engineering, Apr. 18, 2020, 7 pages.

European Patent Office Office Action for EP Application No. 23849005.6—1207/4394769 PCT/CN2023096246, date Dec. 16, 2024, including search strategy details in p. 10.

Michelsanti, Daniel et al., "An Overview of Deep-Learning-Based Audio-Visual Speech Enhancement and Separation", Electronic Systems, dated Aug. 21, 2020.

\* cited by examiner

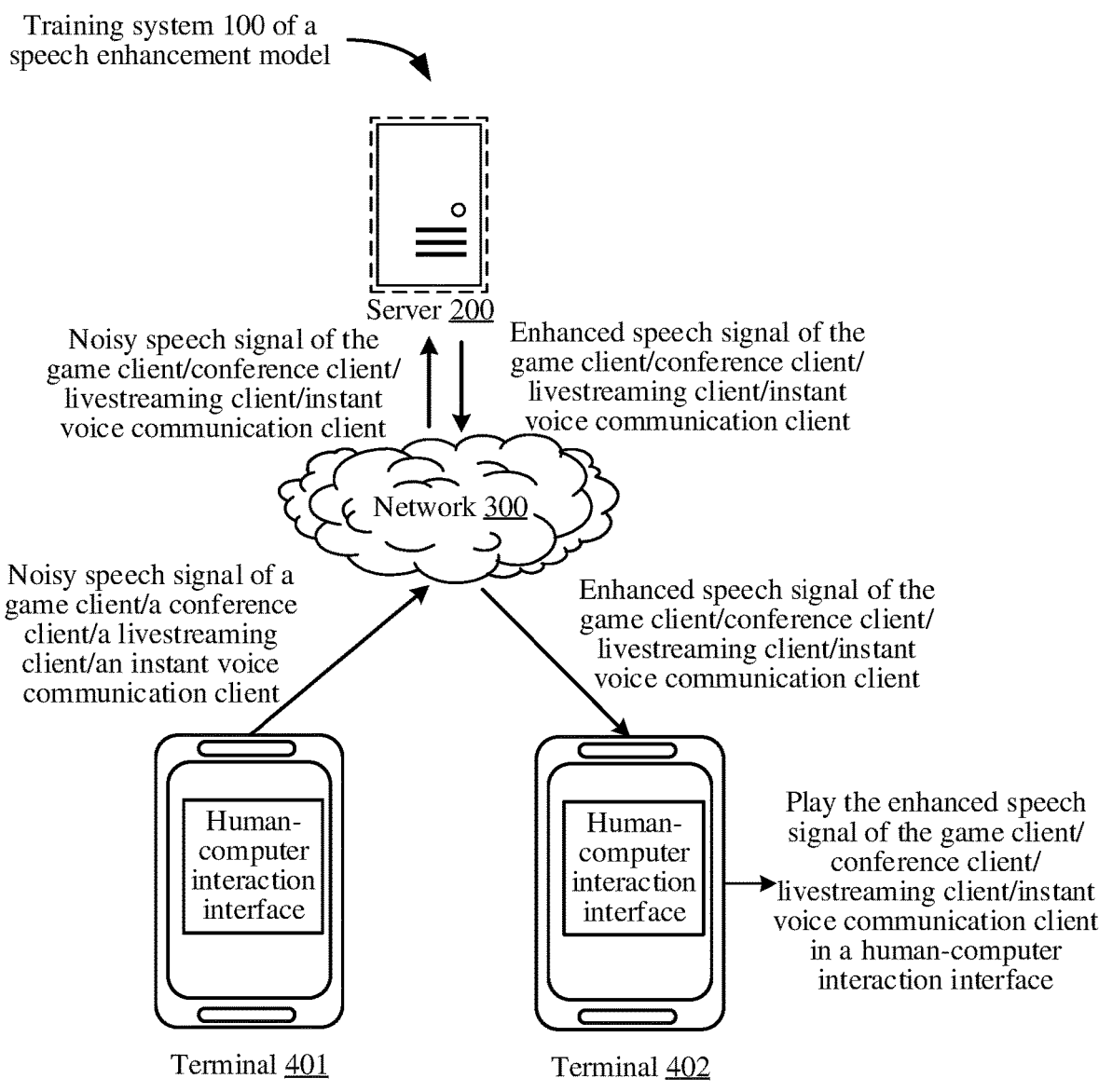

Training system 100 of a
speech enhancement model

Server 200

Noisy speech signal of the
game client/conference client/
livestreaming client/instant
voice communication client Enhanced speech signal of the
game client/conference client/
livestreaming client/instant
voice communication client Network 300

Noisy speech signal of a
game client/a conference
client/a livestreaming
client/an instant voice
communication client Enhanced speech signal of the
game client/conference client/
livestreaming client/instant
voice communication client Human-
computer
interaction
interface Human-
computer
interaction
interface Play the enhanced speech
signal of the game client/
conference client/
livestreaming client/instant
voice communication client
in a human-computer
interaction interface Terminal 401

Terminal 402

FIG. 1

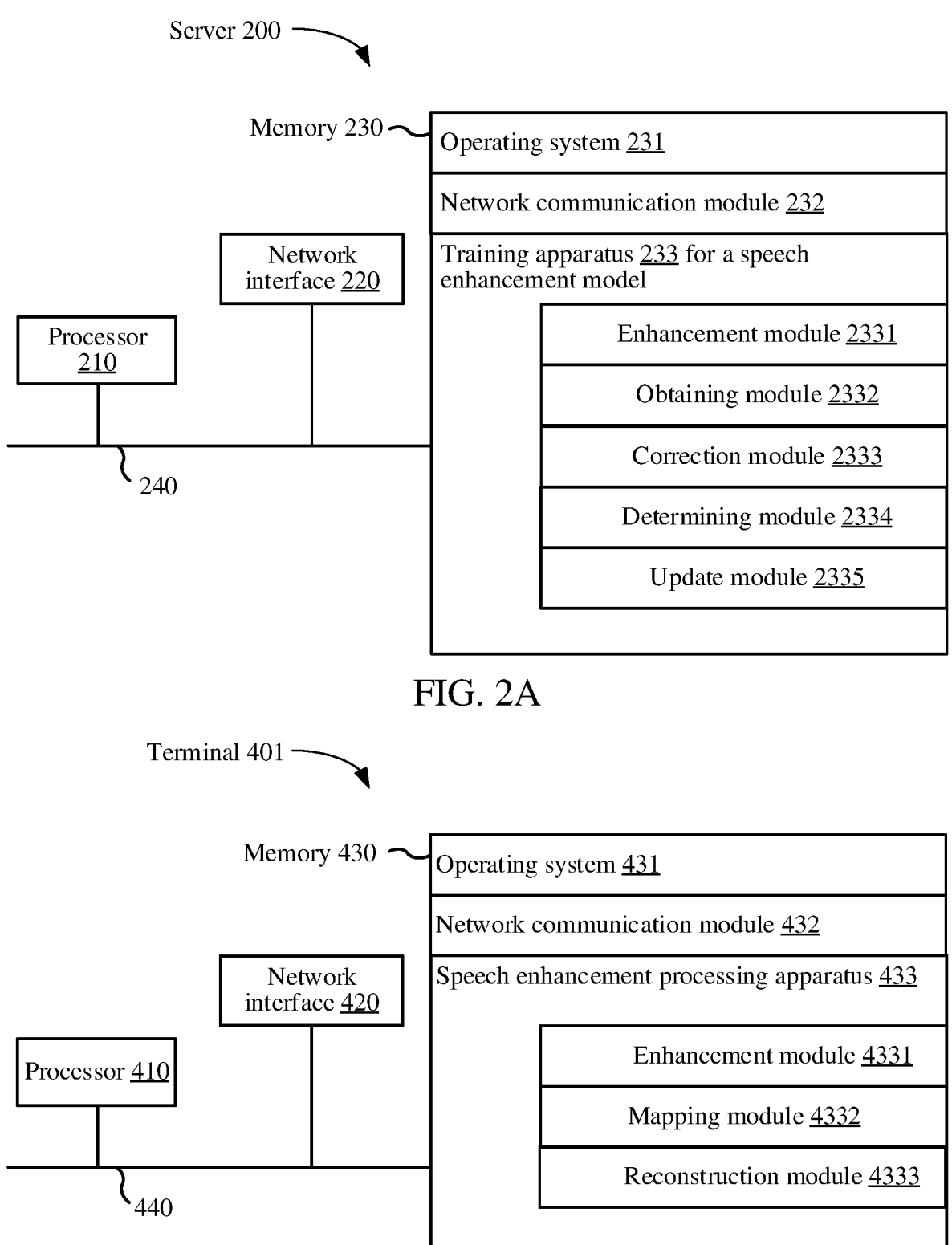

Server 200

Memory 230

Operating system 231

Network communication module 232

Training apparatus 233 for a speech enhancement model

Enhancement module 2331

Obtaining module 2332

Correction module 2333

Determining module 2334

Update module 2335

Network interface 220

Processor 210

Terminal 401

Memory 430

Operating system 431

Network communication module 432

Speech enhancement processing apparatus 433

Enhancement module 4331

Mapping module 4332

Reconstruction module 4333

Network interface 420

Processor 410

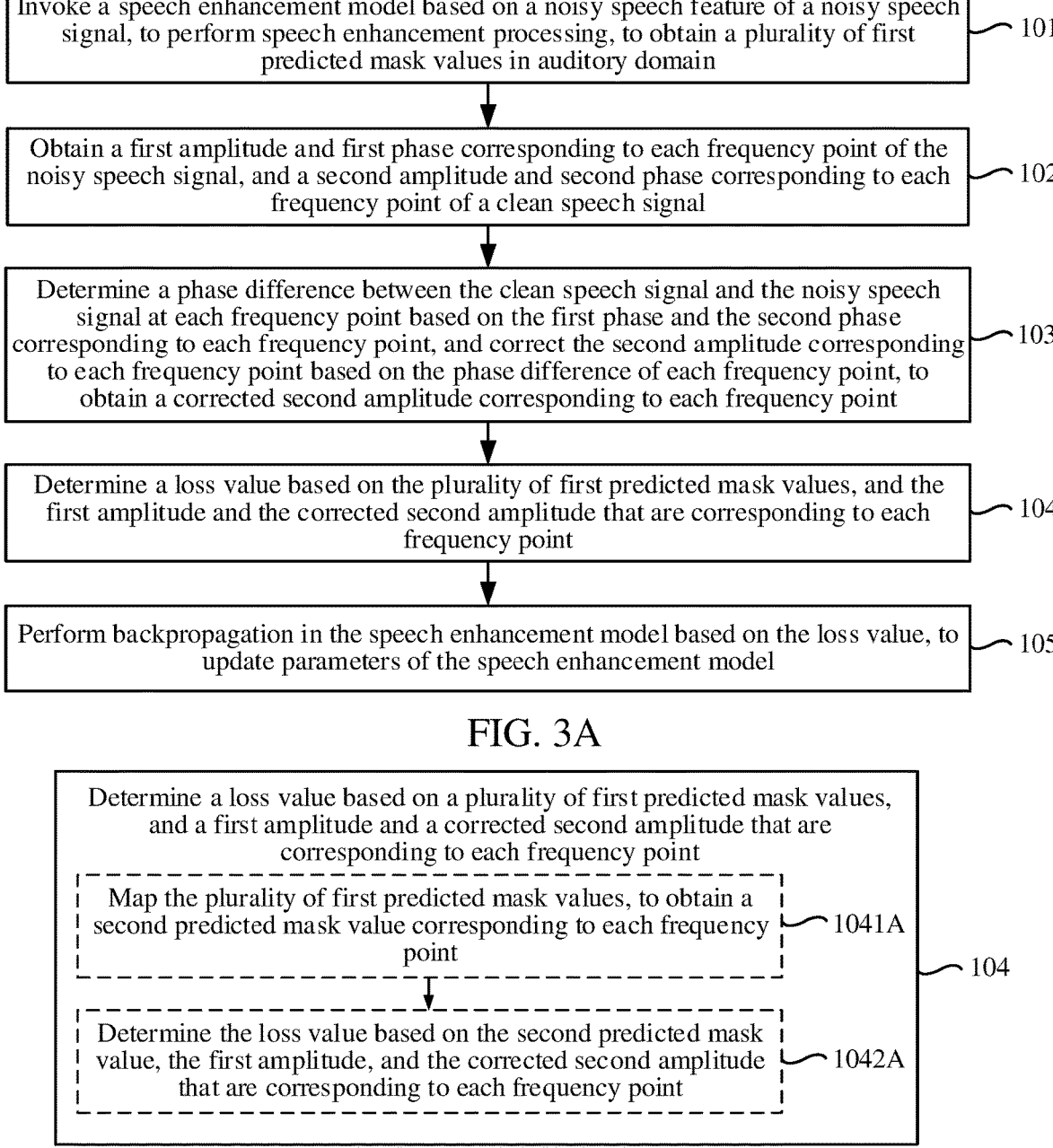

Invoke a speech enhancement model based on a noisy speech feature of a noisy speech signal, to perform speech enhancement processing, to obtain a plurality of first predicted mask values in auditory domain ⟋ 101

Obtain a first amplitude and first phase corresponding to each frequency point of the noisy speech signal, and a second amplitude and second phase corresponding to each frequency point of a clean speech signal ⟋ 102

Determine a phase difference between the clean speech signal and the noisy speech signal at each frequency point based on the first phase and the second phase corresponding to each frequency point, and correct the second amplitude corresponding to each frequency point based on the phase difference of each frequency point, to obtain a corrected second amplitude corresponding to each frequency point ⟋ 103

Determine a loss value based on the plurality of first predicted mask values, and the first amplitude and the corrected second amplitude that are corresponding to each frequency point ⟋ 104

Perform backpropagation in the speech enhancement model based on the loss value, to update parameters of the speech enhancement model ⟋ 105

FIG. 3A

Determine a loss value based on a plurality of first predicted mask values, and a first amplitude and a corrected second amplitude that are corresponding to each frequency point Map the plurality of first predicted mask values, to obtain a second predicted mask value corresponding to each frequency point ⟋ 1041A Determine the loss value based on the second predicted mask value, the first amplitude, and the corrected second amplitude that are corresponding to each frequency point ⟋ 1042A

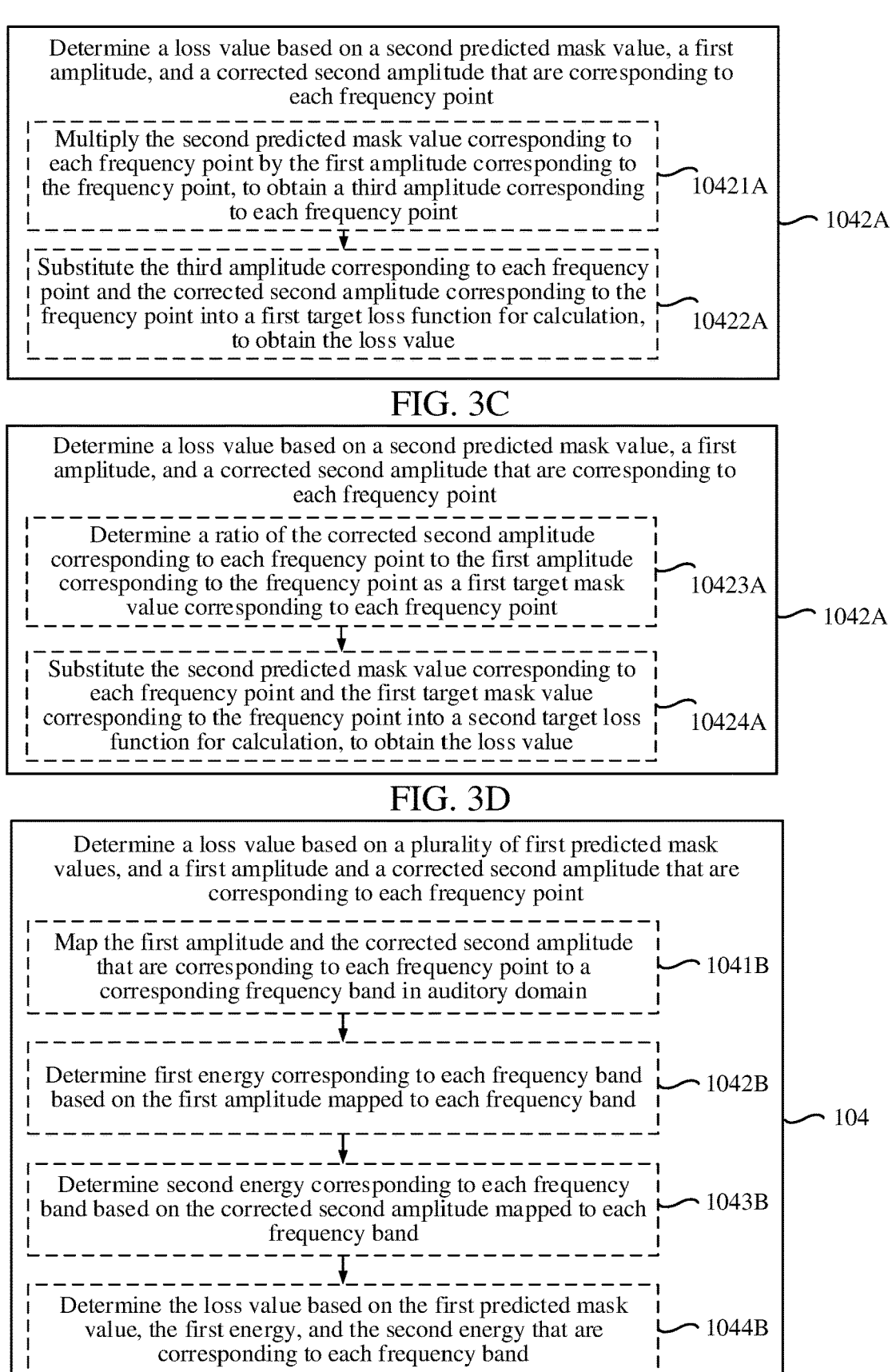

Determine a loss value based on a second predicted mask value, a first amplitude, and a corrected second amplitude that are corresponding to each frequency point Multiply the second predicted mask value corresponding to each frequency point by the first amplitude corresponding to the frequency point, to obtain a third amplitude corresponding to each frequency point     10421A Substitute the third amplitude corresponding to each frequency point and the corrected second amplitude corresponding to the frequency point into a first target loss function for calculation, to obtain the loss value     10422A

Determine a loss value based on a second predicted mask value, a first amplitude, and a corrected second amplitude that are corresponding to each frequency point Determine a ratio of the corrected second amplitude corresponding to each frequency point to the first amplitude corresponding to the frequency point as a first target mask value corresponding to each frequency point     10423A Substitute the second predicted mask value corresponding to each frequency point and the first target mask value corresponding to the frequency point into a second target loss function for calculation, to obtain the loss value     10424A

Determine a loss value based on a plurality of first predicted mask values, and a first amplitude and a corrected second amplitude that are corresponding to each frequency point Map the first amplitude and the corrected second amplitude that are corresponding to each frequency point to a corresponding frequency band in auditory domain     1041B Determine first energy corresponding to each frequency band based on the first amplitude mapped to each frequency band     1042B Determine second energy corresponding to each frequency band based on the corrected second amplitude mapped to each frequency band     1043B Determine the loss value based on the first predicted mask value, the first energy, and the second energy that are corresponding to each frequency band     1044B

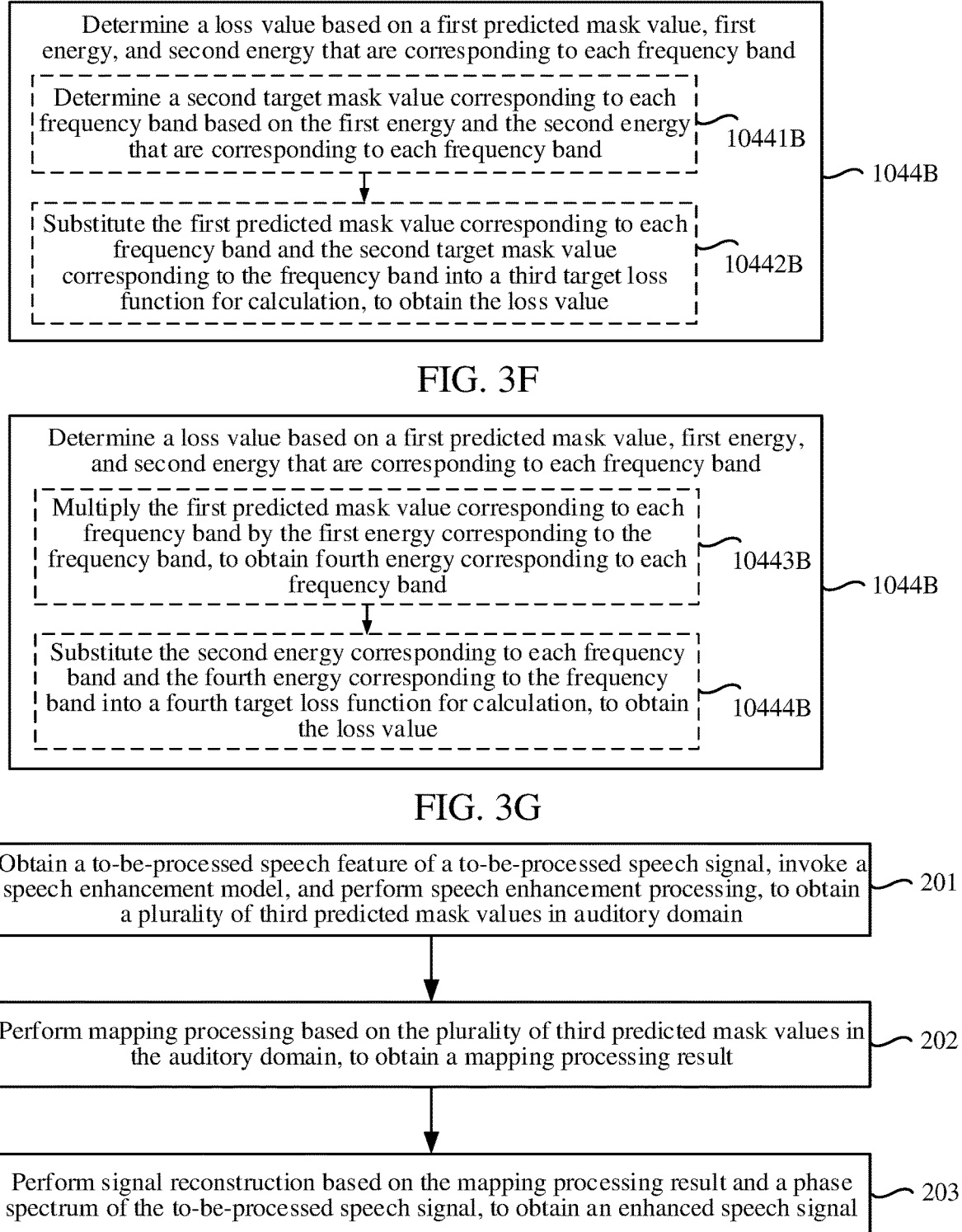

Determine a loss value based on a first predicted mask value, first energy, and second energy that are corresponding to each frequency band Determine a second target mask value corresponding to each frequency band based on the first energy and the second energy that are corresponding to each frequency band — 10441B Substitute the first predicted mask value corresponding to each frequency band and the second target mask value corresponding to the frequency band into a third target loss function for calculation, to obtain the loss value — 10442B

Determine a loss value based on a first predicted mask value, first energy, and second energy that are corresponding to each frequency band Multiply the first predicted mask value corresponding to each frequency band by the first energy corresponding to the frequency band, to obtain fourth energy corresponding to each frequency band — 10443B Substitute the second energy corresponding to each frequency band and the fourth energy corresponding to the frequency band into a fourth target loss function for calculation, to obtain the loss value — 10444B

Obtain a to-be-processed speech feature of a to-be-processed speech signal, invoke a speech enhancement model, and perform speech enhancement processing, to obtain a plurality of third predicted mask values in auditory domain — 201

Perform mapping processing based on the plurality of third predicted mask values in the auditory domain, to obtain a mapping processing result — 202

Perform signal reconstruction based on the mapping processing result and a phase spectrum of the to-be-processed speech signal, to obtain an enhanced speech signal — 203

FIG. 3H

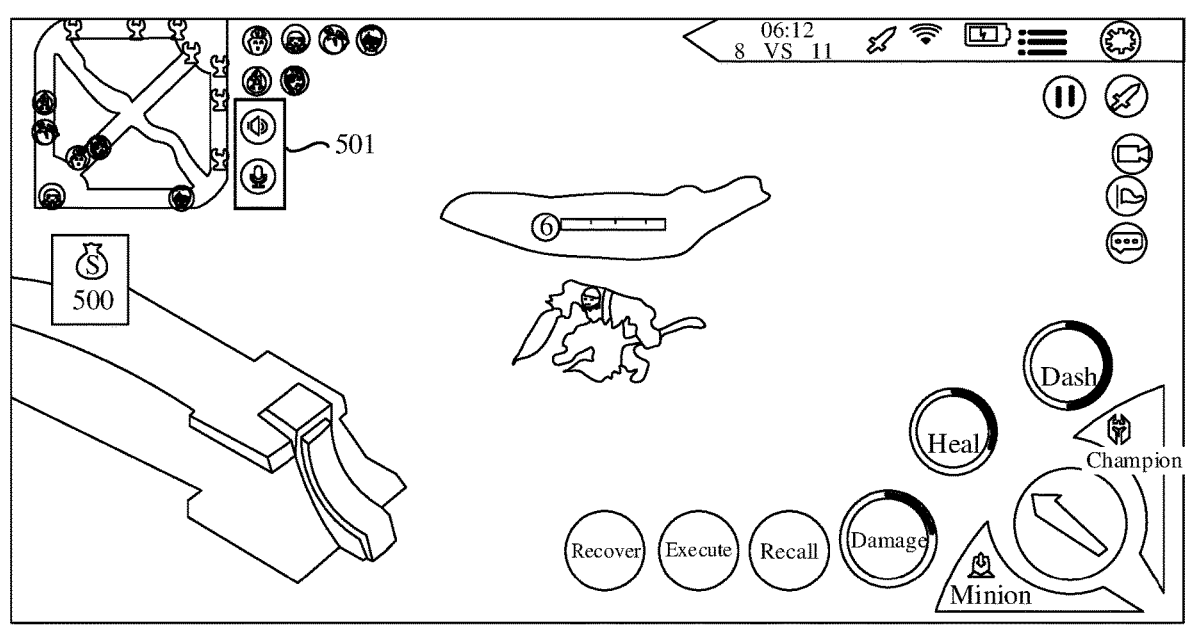
FIG. 5
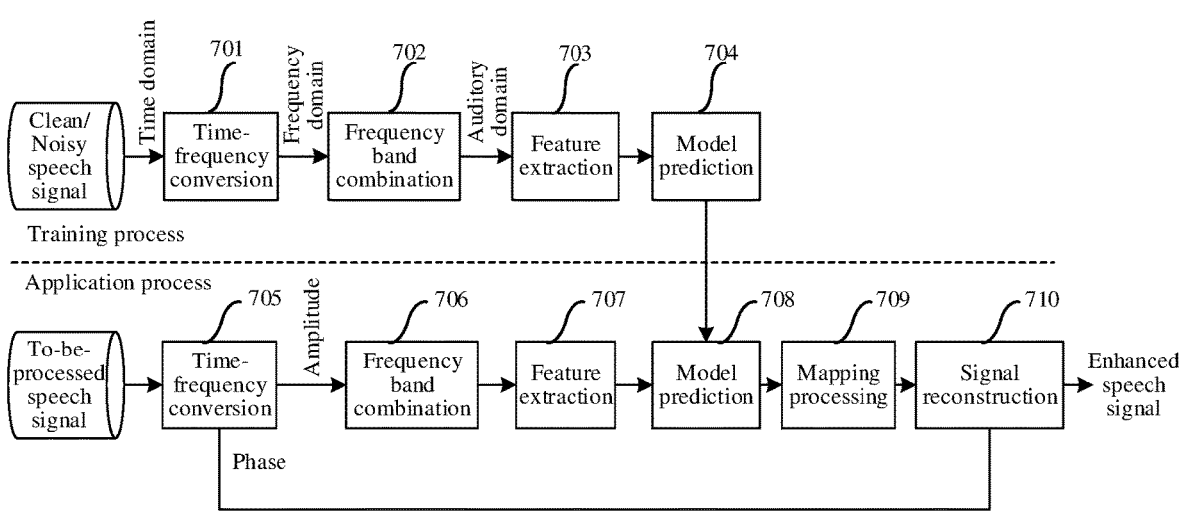
FIG. 6
FIG. 7

TRAINING METHOD AND ENHANCEMENT METHOD FOR SPEECH ENHANCEMENT MODEL, APPARATUS, ELECTRONIC DEVICE, STORAGE MEDIUM AND PROGRAM PRODUCT

RELATED APPLICATIONS

This application is based upon and claims priority to Chinese Patent Application No. 202210917051.5, filed on Aug. 1, 2022, and is a continuation of PCT Application No. PCT/CN2023/096246, filed May 25, 2023, both of which are incorporated herein by reference in its entirety.

TECHNICAL FIELD

This application relates to an artificial intelligence technology, and in particular, to a training method and an enhancement method for a speech enhancement model, an apparatus, an electronic device, a storage medium and a program product.

BACKGROUND

Artificial intelligence (AI) is a comprehensive technology of computer science. By studying design principles and implementation methods of various intelligent machines, machines may have perception, inference, and decision-making functions. Artificial intelligence technology is a comprehensive subject that involves a wide range of fields, such as natural language processing technology and machine learning/deep learning and other major directions. With development of technologies, the artificial intelligence technology may be widely used in more fields and play an increasingly important role.

With rapid development of deep learning, an application of deep learning in the field of speech enhancement is increasing. In the related art, a speech enhancement model based on deep learning performs speech enhancement processing (for example, noise reduction processing) on a noisy speech signal in a complex scenario, but a noise reduction effect of an obtained speech signal is unpredictable.

SUMMARY

Aspects described herein provide a training method, a speech enhancement method for a speech enhancement model, an apparatus, an electronic device, a computer-readable storage medium, and a computer program product. By incorporating phase into a loss function during training the speech enhancement model, a noise reduction effect of the speech enhancement model may be significantly improved.

Aspects described herein may include the following:

A training method for a speech enhancement model, performed by an electronic device, which may include:

invoking the speech enhancement model, based on a noisy speech feature of a noisy speech signal, to perform speech enhancement, to obtain a plurality of first predicted mask values in auditory domain, the plurality of first predicted mask values one-to-one corresponding to a plurality of frequency bands in the auditory domain;

obtaining a first amplitude and first phase that are corresponding to each frequency point of the noisy speech signal, and a second amplitude and second phase that are corresponding to each frequency point of a clean speech signal;

determining a phase difference between the clean speech signal and the noisy speech signal at each frequency point based on the first phase and the second phase that are corresponding to each frequency point, and correcting the second amplitude corresponding to the frequency point, based on the phase difference at each frequency point, to obtain a corrected second amplitude corresponding to each frequency point;

determining a loss value based on the plurality of first predicted mask values, and the first amplitude and the corrected second amplitude that are corresponding to each frequency point; and performing backpropagation in the speech enhancement model based on the loss value, to update parameters of the speech enhancement model.

A speech enhancement processing method, performed by an electronic device, which may include:

invoking a speech enhancement model based on a to-be-processed speech feature of a to-be-processed speech signal, to perform speech enhancement, to obtain a plurality of third predicted mask values, the plurality of third mask values one-to-one corresponding to a plurality of frequency bands in auditory domain, and the speech enhancement model being obtained through training according to a training method for a speech enhancement model;

performing mapping processing based on the plurality of third predicted mask values to obtain a mapping processing result; and performing signal reconstruction based on the mapping processing result and a phase spectrum of the to-be-processed speech signal, to obtain an enhanced speech signal.

A training apparatus for a speech enhancement model, which may include:

an enhancement module, configured to invoke a speech enhancement model based on a noisy speech feature of a noisy speech signal, to perform speech enhancement processing, to obtain a plurality of first predicted mask values in auditory domain, the plurality of first predicted mask values one-to-one corresponding to a plurality of frequency bands in auditory domain;

an obtaining module, configured to obtain a first amplitude and first phase that are corresponding to each frequency point of the noisy speech signal, and a second amplitude and second phase that are corresponding to each frequency point of a clean speech signal;

a correction module, configured to determine a phase difference between the clean speech signal and the noisy speech signal at each frequency point based on the first phase and the second phase that are corresponding to each frequency point, and correct the second amplitude corresponding to the frequency point based on the phase difference at each frequency point, to obtain a corrected second amplitude corresponding to each frequency point;

a determining module, configured to determine a loss value based on the plurality of first predicted mask values, and the first amplitude and the corrected second amplitude that are corresponding to each frequency point; and

an update module, configured to perform backpropagation in the speech enhancement model based on the loss value to update parameters of the speech enhancement model.

A speech enhancement processing apparatus, which may include:

an enhancement module, configured to invoke a speech enhancement model based on a to-be-processed speech feature of a to-be-processed speech signal, to perform speech enhancement, to obtain a plurality of third predicted mask values, the plurality of third mask values one-to-one corresponding to a plurality of frequency bands in auditory domain, and the speech enhancement model being obtained through training in the training method for a speech enhancement model;

a mapping module, configured to perform mapping processing based on the plurality of third predicted mask values to obtain a mapping processing result; and a reconstruction module, configured to perform signal reconstruction based on the mapping processing result and a phase spectrum of the to-be-processed speech signal to obtain an enhanced speech signal.

An electronic device, which may include:

a memory, configured to store executable instructions; and a processor, configured to execute the executable instructions stored in the memory, to implement the training method for a speech enhancement model or a speech enhancement processing method.

Aspects described herein may also provide a computer-readable storage medium storing executable instructions. When executed by a processor, the executable instructions may be used for implementing a training method for a speech enhancement model or a speech enhancement processing method.

Aspects described herein may also provide a computer program product. The computer program product may include computer instructions, and the computer instructions may be stored in a computer-readable storage medium. A processor of an electronic device may read the computer instructions from the computer-readable storage medium, and the processor may execute the computer instructions, causing the electronic device to perform a training method for a speech enhancement model or a speech enhancement processing method.

Aspects described herein may have the following beneficial effects:

The amplitude of the clean speech signal at each frequency point is corrected based on the phase difference between the noisy speech signal and the clean speech signal at each frequency point. The loss value is determined based on the amplitude of the corrected clean speech signal, the amplitude of the noisy speech signal, and the plurality of first predicted mask values output by the speech enhancement model. Because the loss value is calculated with reference to the phase and the amplitude of the speech signal, the speech enhancement model can be trained, based on the loss value that integrates the phase and the amplitude, on how to distinguish between speech and noise in the noisy speech signal. This breaks through a technical barrier that phase cannot be introduced into an auditory domain-based system in the related art. The enhanced speech signal that is determined based on the predicted mask value output by the trained speech enhancement model is not only close to the clean speech signal in amplitude, but also close to the clean speech signal in phase, to improve the noise reduction effect.

BRIEF DESCRIPTION OF THE DRAWINGS

FIG. 1 is a schematic diagram of an example architecture of a training system 100 for a speech enhancement model according to one or more aspects described herein.

FIG. 2A is a schematic diagram of an example structure of a server 200 according to one or more aspects described herein.

FIG. 2B is a schematic diagram of an example structure of a terminal 401 according to one or more aspects described herein.

FIG. 3A is a schematic flowchart of steps 101 to 105 of an example training method for a speech enhancement model according to one or more aspects described herein.

FIG. 3B is a schematic flowchart of steps 1041A and 1042A of an example training method for a speech enhancement model according to one or more aspects described herein.

FIG. 3C is a schematic flowchart of steps 10421A and 10422A of an example training method for a speech enhancement model according to one or more aspects described herein.

FIG. 3D is a schematic flowchart of steps 10423A and 10424A of an example training method for a speech enhancement model according to one or more aspects described herein.

FIG. 3E is a schematic flowchart of steps 1041B to 1044B of an example training method for a speech enhancement model according to one or more aspects described herein.

FIG. 3F is a schematic flowchart of steps 10441B and 10442B of an example training method for a speech enhancement model according to one or more aspects described herein.

FIG. 3G is a schematic flowchart of steps 10443B and 10444B of an example training method for a speech enhancement model according to one or more aspects described herein.

FIG. 3H is a schematic flowchart of an example speech enhancement processing method according to one or more aspects described herein.

FIG. 5 is an example schematic diagram of performing speech enhancement in a game client according to one or more aspects described herein.

FIG. 6 is an example schematic diagram of speech enhancement in a voice call according to one or more aspects described herein.

FIG. 7 is a schematic diagram of example training and application processes of a speech enhancement model according to one or more aspects described herein.

DETAILED DESCRIPTION

Figure 4A:
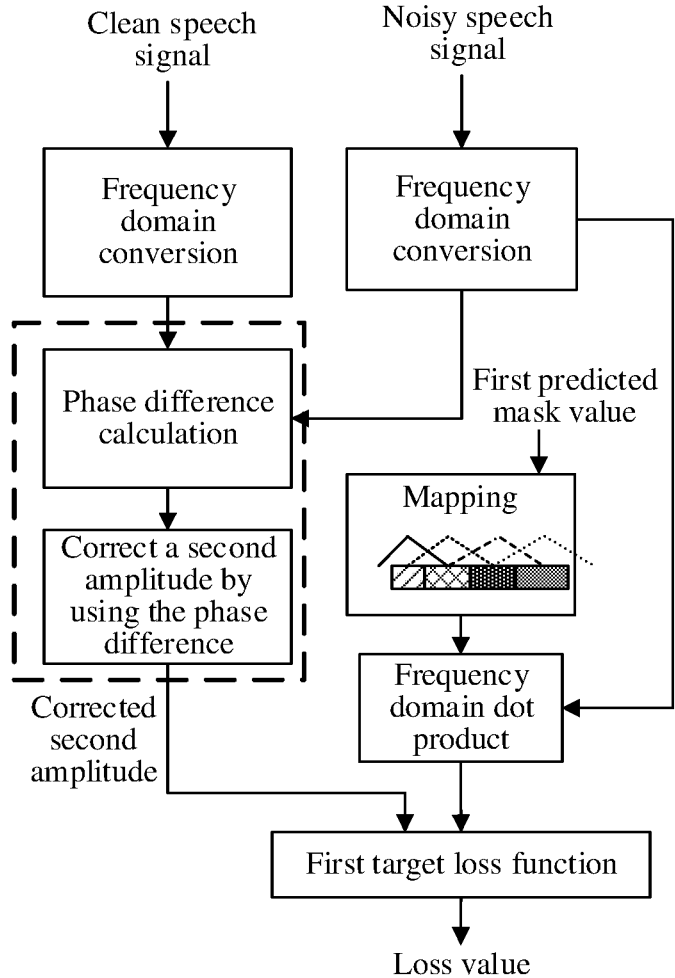
FIG. 4A is a schematic flowchart of an example first implementation of determining a loss value corresponding to frequency domain according to one or more aspects described herein.

Details of the aspects described herein are provided with reference to the accompanying drawings. The details are not limiting. Other aspects that can be obtained by a person of ordinary skill in the art without creative efforts fall within the scope of protection.

In the following descriptions, "some aspects" may describe a subset of possible aspects, but it is understood that "some aspects" may be the same subset or different subsets of the possible aspects, and can be combined with each other without conflict.

In the following descriptions, the words "first, second, or third" are merely used to distinguish between similar objects and do not represent a specific order for objects. A specific order or sequence of the objects described by using "first, second, or third" may be exchanged if allowed, so that aspects described herein can be implemented and/or performed in an order other than that illustrated or described herein.

Unless otherwise specified, all technical and scientific terms used in this specification have meanings as may be typically understood by a person skilled in the art. In addition, the terms used herein are merely for the purpose of describing various aspects, and are not intended to be limiting.

It may be understood that, according to aspects described herein, relevant data such as user information may be involved. User permission or consent may need to be obtained, and collection, use, and processing of the relevant data may need to comply with relevant laws, regulations, and standards of relevant countries and regions.

Before further describing aspects in detail, various terms are explained.

(1) Game voice: Voice communication between game players in a game scene.

(2) Game voice software development kit (SDK): A software development kit that may be embedded in a game client and that may be used to realize the voice communication between the game players.

(3) Speech enhancement: Suppressing interference noise in a speech signal and improving quality and intelligibility (Short Time Objective Intelligibility, STOI) of a speech signal. Intelligibility may refer to clarity of language, indicating a percentage of voice signals that are transmitted through a specific sound transmission system and that a listener can understand. For example, if the listener hears 100 words through the specific sound transmission system, and the listener hears 50 words correctly, the intelligibility of the speech signal in this case may be 50%.

(4) Auditory domain: An auditory response range of a human car. The abscissa may represent sound wave frequency, and the ordinate may represent sound intensity. The auditory domain is an area surrounded by a hearing threshold line, a pain threshold line, a line of 20 Hz and a line of 20,000 Hz. Minimum sound intensity of a sound that the human car can hear may be referred to as a hearing threshold. Hearing thresholds at different frequency points may constitute the hearing threshold line. Minimum sound intensity of a sound that causes auditory pain in the human car may be referred to as a pain threshold. Pain thresholds at different frequency points constitute the pain threshold line. 20 Hertz (Hz) may be minimum frequency that the human car can perceive, and 20,000 Hz may be maximum frequency that the human car can perceive. Types of auditory domain may include Bark domain, Mel domain, and the like.

(5) Loss function: The loss function may be used to determine a quantifiable difference between a true value and a predicted value. A training process of a neural network model may be a process of minimizing, by adjusting parameters, a loss value determined by the loss function. For the same neural network model, different loss functions can achieve different training results. For a specific training task, choosing a better loss function can make the neural network model improve accuracy of prediction results in same inference complexity.

(6) Phase: A measure used to describe changes in waveforms of an audio signal, usually measured in angle, and may also be referred to as a phase angle.

(7) Amplitude: An amplitude of an audio signal. For example, an amplitude spectrum of an audio signal records changes of the amplitude of the audio signal within a frequency range. The frequency range may be 20 Hz to 20,000 Hz that the human ear can perceive, and each frequency point may correspond to an amplitude.

(8) Frequency domain: A coordinate system used to describe frequency features of an audio signal. A waveform diagram drawn in the frequency domain may include a spectrogram and a phase spectrum. The abscissa of the spectrogram may be a frequency of the audio signal, and the ordinate of the spectrogram may be an amplitude of the audio signal. The audio signal can be converted from time domain to the frequency domain through a Fourier transform.

(9) Frequency point: An absolute frequency value, such as a center frequency of a modulated signal. The frequency point may be a fixed frequency value.

(10) Mask: Calculation methods of the mask may include ideal binary mask (IBM) and ideal ratio mask (IRM). Frequency points of the mask may correspond to frequency points of the noisy speech signal. A value range of the mask may be a closed interval between 0 and 1. When a value of the mask is 1, energy of speech in the frequency points may be greater than energy of noise, so that corresponding spectral components in the spectrogram may need to be completely reserved; when the value of the mask is 0, the energy of speech in the frequency points may be less than the energy of noise, so that the corresponding spectral components in the spectrogram may need to be completely removed; or when the value of the mask is greater than 0 and less than 1, the corresponding spectral components in the spectrogram may need to be suppressed. A dot product of a spectrogram of the noisy speech signal and masks of a plurality of frequency points may be obtained, and then inverse Fourier transform may be performed on the dot product, so that a noise-removed speech signal can be obtained.

A game voice scenario is used as an example in the following description. A game client can usually provide a game voice service. When a user uses game voice in a noisy environment, a microphone collects various environmental noises. When using game voice in a multi-player team, if one party's voice has noise interference, voice call quality of all team members may be affected. Therefore, speech enhancement may be needed to reduce noise in speech.

In speech enhancement tasks based on deep learning in the related art, a speech enhancement model is usually trained based on an amplitude of a speech signal, while a phase of the speech signal is typically not considered. This is because in an auditory domain-based system, the phase of the speech signal is nonlinear, and the phase cannot be directly used for linear superposition when combining frequency bands. Because the phase of the speech signal is not used in a training process of the speech enhancement model in the related art, a noise reduction effect of a trained speech enhancement model is poor.

According to aspects described herein, a training method for a speech enhancement model, a speech enhancement processing method, a training apparatus for a speech enhancement model, an electronic device, a computer-readable storage medium, and a computer program product, are provided to improve a noise reduction effect of a trained speech enhancement model. The following describes an example use of an electronic device for training a speech enhancement model. An electronic device for training the speech enhancement model may be implemented as or include various types of user terminals such as a notebook computer, a tablet computer, a desktop computer, a set-top box, a mobile device (such as a mobile phone, a portable music player, a personal digital assistant, a dedicated messaging device, a portable game device, or a vehicle-mounted terminal), or may be implemented as a server. The following describes one example where the electronic device is implemented as a server.

The training method of a speech enhancement model may be independently performed by a terminal or a server, or may be implemented by a terminal and a server collaboratively. FIG. 1 is a schematic diagram of an example architecture of a training system 100 of a speech enhancement model. The training system 100 includes a server 200, a terminal 401, and a terminal 402 that makes a voice call with the terminal 401. The terminal 401 and the terminal 402 are connected to the server 200 through a network 300. The network 300 may be a wide area network or a local area network, or a combination of the two.

In some examples, a user may operate a speech enhancement control of a human-computer interaction interface (for example, a game client, a conference client, a livestreaming client, or an instant voice communication client) of the terminal 401, and the terminal 401 may transmit, in response to the user's operation on the speech enhancement processing control, a noisy speech signal generated by a client to the server 200 through the network 300. The server 200 may invoke the speech enhancement model to perform speech enhancement on the noisy speech signal transmitted by the terminal 401 through the network 300, to obtain an enhanced speech signal. The enhanced speech signal may be sent through the network 300 to the terminal 402 that makes the voice call with the terminal 401, so that the user using a client of the terminal 402 can hear the enhanced speech signal.

In some arrangements, the server 200 may be an independent physical server, a server cluster or a distributed system including a plurality of physical servers, or a cloud server that provides cloud services, cloud database, cloud computing, cloud functions, cloud storage, network services, cloud communication, middleware services, domain name services, security services, CDN, big data, and basic cloud computing service such as an artificial intelligence platform. The terminal 401 or the terminal 402 may be a smart phone, a tablet computer, a notebook computer, a desktop computer, a smart speaker, a smart watch, or the like, and is not limited to such examples. The terminal and the server may be connected directly or indirectly in a wired communication manner or a wireless communication manner, but is not limited to such configurations.

The following description uses an example in which the electronic device in the training method for the speech enhancement model is a server, to provide details of a structure of the electronic device. FIG. 2A is a schematic diagram of an example structure of a server 200. The server 200 shown in FIG. 2A includes at least one processor 210, a memory 230, and at least one network interface 220. Various components in the server 200 may be coupled together through a bus system 240. It may be understood that the bus system 240 is configured to implement connection and communication between these components. In addition to a data bus, the bus system 240 may further include a power bus, a control bus, a status signal bus, and the like. Various buses are marked as the bus system 240 in FIG. 2A.

The processor 210 may be an integrated circuit chip having a signal processing capability, such as a general-purpose processor, a digital signal processor (DSP), or another programmable logic device, a discrete gate or a transistor logic device, or a discrete hardware component. The general-purpose processor may be a microprocessor or any conventional processor.

The memory 230 may be removable, non-removable, or a combination thereof. For example, hardware devices include a solid state memory, a hard disk drive, an optical disk drive, and the like. Optionally, the memory 230 may include one or more storage devices physically located away from the processor 210.

The memory 230 may be a volatile memory or a non-volatile memory, or may include both a volatile memory and a non-volatile memory. The non-volatile memory may be a read-only memory (ROM), and the volatile memory may be a random access memory (RAM). The memory 230 may include any memory of proper type.

In some examples, the memory 230 can store data to support various operations, such as programs, modules, and data structures, or subsets or supersets thereof, as further described below.

An operating system 231 may include system programs used to handle various basic system services and execute hardware-related tasks, such as a framework layer, a core library layer, a driver layer, to implement various basic services and handle hardware-related tasks.

A network communication module 232 may be configured to reach another computing device via one or more (wired or wireless) network interfaces 220. For example, the network interface 220 includes Bluetooth, wireless compatibility certification (Wi-Fi), universal serial bus (USB), and the like.

In some arrangements, the training apparatus of the speech enhancement model may be implemented by using software. FIG. 2A shows an example training apparatus 233 of the speech enhancement model stored in the memory 230. The training apparatus 233 may be software in a form of programs, plugins, or the like, including the following software modules: an enhancement module 2331, an obtaining module 2332, a correction module 2333, a determining module 2334 and an update module 2335. These modules are logical, and may be combined or further disassembled in any way based on the functions implemented.

The following description of a structure of an electronic device uses an example in which an electronic device that performs the speech enhancement processing method is a terminal. FIG. 2B is a schematic diagram of an example structure of a terminal 401. The terminal 401 shown in FIG. 2B may include at least one processor 410, a memory 430, and at least one network interface 420.

An operating system 431 may include system programs used to handle various basic system services and execute hardware-related tasks, such as a framework layer, a core library layer, a driver layer, to implement various basic services and handle hardware-related tasks.

A network communication module 432 may be configured to reach another computing device via one or more (wired or wireless) network interfaces 420. For example, the network interface 420 includes Bluetooth, wireless compatibility certification (Wi-Fi), universal serial bus (USB), and the like.

In some examples, the speech enhancement processing apparatus may be implemented by using software. FIG. 2B shows an example speech enhancement processing apparatus 433 stored in the memory 430. The speech enhancement processing apparatus 433 may be software in a form of programs, plugins, or the like, including the following software modules: an enhancement module 4331, a mapping module 4332, and a reconstruction module 4333. These modules are logical, and may be combined or further disassembled in any way based on the functions implemented.

The following description of a training method for a speech enhancement model refers to an example application and implementation of the electronic device. The following method may be independently performed by the foregoing terminal 401 or the foregoing server 200, or may be collaboratively performed by the foregoing terminal 401 and the foregoing server 200.

FIG. 3A is a schematic flowchart of steps 101 to 105 of an example training method for a speech enhancement model. Descriptions are provided with reference to the steps 101 to 105 shown in FIG. 3A.

In step 101, the speech enhancement model may be invoked based on a noisy speech feature of a noisy speech signal, to perform speech enhancement processing, and obtain a plurality of first predicted mask values in an auditory domain.

The noisy speech signal may be obtained by adding noise to a clean speech signal (that is, a speech signal without noise). For example, sound collection may be performed on a sound source (for example, a human or an electronic device that plays human voice without noise) in a noise-free environment to obtain a clean speech signal, and then noise may be added to the clean speech signal to obtain a noisy speech signal. Alternatively, sound collection may be performed on a sound source in a noise-free environment to obtain a clean speech signal, and then sound collection may be performed on the same sound source in a noisy environment to obtain a noisy speech signal. Sounds emitted by the sound source in the noise-free environment and in the noisy environment may be the same, for example, when a human reads the same text by using the same three elements of sound (namely, loudness, pitch, and timbre), or an electronic device plays a noise-free speech of a human reading the same text.

The noisy speech feature may be obtained by performing feature extraction on the noisy speech signal after the noisy speech signal is obtained. The following examples are described.

First, the noisy speech signal may be transformed from time domain to frequency domain to obtain a spectrum. The spectrum may include an amplitude spectrum and a phase spectrum. An independent variable of the amplitude spectrum may be frequency, and a dependent variable of the amplitude spectrum may be an amplitude. This may represent that the amplitude changes with the frequency. An independent variable of the phase spectrum may be frequency, and a dependent variable of the phase spectrum may be phase. This may represent that the phase changes with the frequency. The transform process from the time domain to the frequency domain may include a Fourier transform (FT), including fast Fourier transform (FFT) and discrete Fourier transform (DFT).

Second, a first amplitude corresponding to a plurality of frequency points in the frequency domain may be read from the amplitude spectrum. A frequency of the frequency point may be related to a quantity of sampling times of the amplitude spectrum. Specifically, it may be calculated based on Formula 1 below. Frequency band combination may be performed on first amplitudes corresponding to the noisy speech signal at the plurality of frequency points in the frequency domain, to obtain a plurality of amplitudes corresponding to the noisy speech signal in the auditory domain. The frequency band combination may include: For each frequency point, a first amplitude at the frequency point is used as an amplitude of the corresponding frequency point in the auditory domain, to uniformly map amplitudes of frequency points with discrete amplitude spectrums to the auditory domain. For example, if two frequency points of 50 Hz and 100 Hz are obtained by sampling the amplitude spectrum, a first amplitude of the frequency point of 50 Hz may be assigned to the frequency point of 50 Hz in the auditory domain, and a first amplitude of the frequency point of 100 Hz may be assigned to the frequency point of 100 Hz in the auditory domain.

Subsequently, feature extraction may be performed based on the plurality of amplitudes corresponding to the noisy speech signal in the auditory domain, to obtain the noisy speech feature. For example, the plurality of amplitudes may be combined into a feature vector representing the noisy speech feature.

In some arrangements, before the feature extraction, the noisy speech signal can be further processed: A dynamic range including the plurality of amplitudes corresponding to the noisy speech signal in the auditory domain may be compressed into a smaller dynamic range, to reduce complexity of subsequent calculation. For example, the plurality of amplitudes may be substituted into a logarithmic function as a real number A in a logarithmic function (lgA), and an obtained index may be used as a new amplitude to replace the original amplitude.

In some examples, before the feature extraction, the noisy speech signal may be further processed: Spectral information of a plurality of noisy speech signals adjacent in a time sequence may be spliced, to form a new noisy speech signal, and replace the original noisy speech signal. The spectral information may be a spectrogram. The abscissa of the spectrogram may be time, and the ordinate may be an amplitude of an audio signal. Through splicing, a time domain view can be enlarged when training the speech enhancement model below, so that the speech enhancement model can be trained on a larger time domain view.

After obtaining the noisy speech feature, the speech enhancement model may be invoked based on the noisy speech feature, to perform speech enhancement processing, to obtain the plurality of first predicted mask values in the auditory domain. Different first predicted mask values may correspond to different frequency bands in the auditory domain. The first predicted mask value may represent a boundary value corresponding to the noisy speech feature, and the first predicted mask value may be used to solve a binary classification problem, e.g., distinguishing between noise and human voice.

A speech enhancement model may be various machine learning models based on deep learning, and a training target may be the IBM. For example, the speech enhancement model may be a deep neural network (DNN) model. Through a plurality of cascaded fully connected layers included in the DNN model, cascaded fully connected calculation may performed on the noisy speech feature a plurality of times, and a mask calculation may be performed on a calculation result output by the last fully connected layer (for example, to normalize the calculation result output by the fully connected layer by using a softmax function), to obtain a plurality of first predicted mask values in the auditory domain, where a value range is a closed interval between 0 and 1.

In some examples, the speech enhancement model may alternatively be a recurrent neural network (RNN) model. Through a plurality of cascaded cyclic units included in the RNN model, a cascaded recursive calculation may be performed on the noisy speech feature a plurality of times, and a mask calculation may be performed on a calculation result output by the last cyclic unit, to obtain a plurality of first predicted mask values in the auditory domain.

Further, the speech enhancement model may alternatively be a convolutional neural network (CNN) model. Through a plurality of cascaded convolution layers included in the CNN model, a cascaded convolution calculation may be performed on the noisy speech feature a plurality of times, and a mask calculation may be performed on a calculation result output by the last convolutional layer, to obtain a plurality of first predicted mask values in the auditory domain.

For example, the auditory domain may include a plurality of different frequency bands, and the plurality of first predicted mask values output by the speech enhancement model may respectively correspond to different frequency bands in the auditory domain. An example in which the auditory domain is Bark domain is used. In the Bark domain, based on features of a human car structure that resonates with 24 frequency points, a frequency of the speech signal is divided into 24 critical frequency bands. The frequency bands included in the Bark domain are close to linear at low frequency, and are close to an exponential distribution at high frequency. Table 1 below shows some frequency bands in the Bark domain.

TABLE 1

Some frequency bands in the Bark domain

| Sequence | Center frequency point (Hz) | Cut-off frequency of each frequency band (Hz) | Bandwidth of each frequency band (Hz) |
|---|---|---|---|
| | | 20 | |
| 1 | 50 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |

The foregoing Table 1 shows some frequency bands in the Bark domain. The center frequency point is a frequency value in the middle of the frequency values corresponding to a frequency band. As shown in Table 1, the $1^{st}$ frequency band of the Bark domain is 20 to 100 Hz, and its center frequency point is 50 Hz and a bandwidth is 80 Hz. The $2^{nd}$ frequency band is 100 to 200 Hz, it's a center frequency point thereof is 150 Hz and a bandwidth thereof is 100 Hz. A third frequency band is 200 to 300 Hz, a center frequency point thereof is 250 Hz, and a bandwidth thereof is 100 Hz.

In step 102, a first amplitude and first phase corresponding to each frequency point of the noisy speech signal may be obtained, and a second amplitude second phase corresponding to each frequency point of the clean speech signal may be obtained.

The noisy speech signal at a plurality of frequency points in the frequency domain separately corresponds to the first amplitude and the first phase (the term "first" is used herein to distinguish from the second amplitude and the second phase of the clean speech signal below, but does not indicate a specific amplitude and phase).

In some arrangements, frequency domain conversion processing may be performed respectively on the noisy speech signal and the clean speech signal, such as Fourier transform, to obtain the amplitude spectrum and the phase spectrum. The first amplitude and the first phase corresponding to the noisy speech signal at each frequency point in the frequency domain may be obtained from the amplitude spectrum through reading. The second amplitude and the second phase corresponding to the clean speech signal at each frequency point in the frequency band may be obtained from the phase spectrum through reading.

The noisy speech signal may be obtained by adding a noise signal to the clean speech signal. The noisy speech signal and the clean speech signal may be sampled by using the same sampling frequency and the same quantity of sampling times, so that a quantity of sampling points of the noisy speech signal is the same as a quantity of sampling points of the clean speech signal.

Frequency of each sampling point (namely, a frequency point) of the noisy speech signal and the clean speech signal may be calculated based on the following formula:

$$fs(n) = \frac{(n-1) * Fs}{N} \qquad \text{Formula 1}$$

fs(n) represents frequency of an $N^{th}$ sampling point of the noisy speech signal and the clean speech signal, where $1 \leq n \leq N$, and N represents sampling times of the noisy speech signal or the clean speech signal, that is, the quantity of sampling points of the noisy speech signal and the clean speech signal. Fs represents the sampling frequency of the noisy speech signal and the clean speech signal, and a value of Fs meets a Nyquist law, that is, Fs is greater than twice the highest frequency of the noisy speech signal.

Because the sampling frequency and the quantity of sampling times may be the same when the noisy speech signal and the clean speech signal are sampled, it can be learned from Formula 1 that, the frequency of the $N^{th}$ sampling point of the noisy speech signal is the same as the frequency of the $N^{th}$ sampling point of the clean speech signal. Therefore, the noisy speech signal and the clean speech signal may have a plurality of identical frequency points in the frequency domain, so that each frequency point might correspond not only to the first amplitude and the first phase of the noisy speech signal, but also to the second amplitude and the second phase of the clean speech signal.

In step 103, a phase difference between the clean speech signal and the noisy speech signal at each frequency point may be determined based on the first phase and the second phase corresponding to each frequency point, and the second amplitude corresponding to each frequency point may be corrected based on the phase difference at each frequency point, to obtain a corrected second amplitude corresponding to each frequency point.

For example, after obtaining the first phase, the second phase, the first amplitude, and the second amplitude that are corresponding to each frequency point, a phase difference between the clean speech signal and the noisy speech signal at the frequency point may be determined based on the first phase and the second phase that are corresponding to each frequency point, and the second amplitude corresponding to the frequency point may be corrected based on the phase difference of the frequency point, to obtain a corrected second amplitude corresponding to the frequency point.

For example, a corrected second amplitude of an $i^{th}$ frequency point may be calculated based on the following formula:

$$S(i) = |si|\cos(\theta_{si} - \theta_{xi}) \qquad \text{Formula 2}$$

S(i) represents the corrected second amplitude corresponding to the $i^{th}$ frequency point, $|si|$ represents the second amplitude corresponding to the $i^{th}$ frequency point of the clean speech signal, $\theta_{si}$ represents the second phase corresponding to the $i^{th}$ frequency point of the clean speech signal, $\theta_{xi}$ represents the first phase corresponding to the $i^{th}$ frequency point of the noisy speech signal, and $(\theta_{si} - \theta_{xi})$ represents a phase difference between the clean speech signal and the noisy speech signal at the $i^{th}$ frequency point.

In step 104, a loss value may be determined based on the plurality of first predicted mask values, and the first amplitude and the corrected second amplitude corresponding to each frequency point.

In one or more examples, after obtaining the corrected second amplitude corresponding to each frequency point, the loss value may be determined based on the plurality of first predicted mask values, and the first amplitude and the corrected second amplitude corresponding to each frequency point in the auditory domain.

Aspects described herein provide two exemplary solutions for determining the loss value. A first solution is to map the plurality of first predicted mask values in the auditory domain to the frequency domain, and determine a corresponding loss value in the frequency domain based on a plurality of second predicted mask values in the frequency domain, and the first amplitude and the corrected second amplitude corresponding to each frequency point in the frequency domain. A second solution is to map the first amplitude and the corrected second amplitude corresponding to each frequency point in the frequency domain to the auditory domain, determine a corresponding second target mask value in the auditory domain based on the first amplitude and the corrected second amplitude corresponding to the auditory domain, and determine a corresponding loss value in the auditory domain based on the second target mask value in the auditory domain and the first predicted mask value in the auditory domain.

The following separately describes the two example solutions for determining the loss value.

The following describes, with reference to the accompanying drawings, the first solution for determining the loss value. FIG. 3B is a schematic flowchart of steps 1041A and 1042A of an example training method for a speech enhancement model. Based on FIG. 3A, step 104 shown in FIG. 3B may be implemented through steps 1041A and 1042A. The following provides descriptions with reference to steps 1041A and 1042A shown in FIG. 3B.

In step 1041A, the plurality of first predicted mask values may be mapped to obtain second predicted mask values corresponding to each frequency point.

For example, in a process of determining the loss value corresponding to the frequency domain, first, the plurality of first predicted mask values may be mapped, to obtain the second predicted mask values corresponding to each frequency point in the frequency domain.

Because each first predicted mask value may correspond to a frequency band in the auditory domain, the first predicted mask values in the auditory domain can be mapped to the second predicted mask values corresponding to each frequency point in the frequency domain through mapping processing.

The mapping processing may mean estimating, based on a set of known discrete point data (for example: the first predicted mask value), approximate values (for example: the second predicted mask value) corresponding to another discrete point (for example: frequency point) within a data range corresponding to discrete point data. According to one or more aspects, the mapping processing may be implemented in a manner of copying or linear weighting. The following provides detailed descriptions.

In some arrangements, step 1041A may be implemented in the following copying manner: In a plurality of pre-divided frequency bands in the auditory domain (for example, pre-divided frequency bands in the BARK domain or the Mel domain), a first frequency band to which the frequency point belongs in the auditory domain may be determined, and a first predicted mask value corresponding to the first frequency band may be determined as the second predicted mask value corresponding to the frequency point.

For example, when determining the second predicted mask value corresponding to each frequency point, first, a frequency band to which each frequency point belongs in the auditory domain may be determined, that is, the first frequency band to which the frequency point belongs in the auditory domain may be determined. For example, when the frequency point is 60 Hz, it can be learned from Table 1 that the frequency point belongs to the $1^{st}$ frequency band of 20 to 100 Hz in the Bark domain. Therefore, the frequency band of 20 to 100 Hz may be determined as the first frequency band to which this frequency point belongs. Then, after the first frequency band is determined, the first predicted mask value corresponding to the first frequency band may be determined as the second predicted mask value corresponding to the frequency point. For example, a first predicted mask value corresponding to the frequency band of 20 to 100 Hz may be determined as the second predicted mask value corresponding to the frequency point of 60 Hz.

In some arrangements, step 1041A may be alternatively implemented in the following linear weighting manner: In a plurality of pre-divided frequency bands in the auditory domain, a first frequency band to which the frequency point belongs in the auditory domain may be determined, and at least one reference frequency band adjacent to the first frequency band in the auditory domain (for example, at least one of a reference frequency band lower than the first frequency band and a reference frequency band higher than the first frequency band) may be determined. Weighted summation may be performed on the first predicted mask value corresponding to the first frequency band and the first predicted mask value corresponding to the at least one reference frequency band, to obtain a second predicted mask value corresponding to the frequency point.

For example, when determining the second predicted mask value corresponding to each frequency point, first, a frequency band to which each frequency point belongs in the auditory domain may be determined, that is, the first frequency band to which the frequency point belongs in the auditory domain may be determined; second, at least one adjacent frequency band of the first frequency band may be determined, and the at least one adjacent frequency band may be determined as a reference frequency band; and finally, the weighted summation may be performed on the first predicted mask value corresponding to the first frequency band and the first predicted mask value corresponding to the reference frequency band, to obtain the second predicted mask value corresponding to the frequency point. The weight corresponding to each of the first predicted mask values may be positively correlated with a distance between the following two elements: the frequency point and a center frequency point of the frequency band corresponding to the first predicted mask value.

For example, when the frequency point is 120 Hz, first, it can be learned from Table 1 that the frequency point belongs to the $2^{nd}$ frequency band of 100 to 200 Hz in the Bark domain. Therefore, a frequency band of 100 to 200 Hz may be determined as the first frequency band to which the frequency point belongs. Second, it can be learned from Table 1 that adjacent frequency bands of the frequency band of 100 to 200 Hz may include two frequency bands of 20 to 100 Hz and 200 to 300 Hz. Therefore, the two frequency bands of 20 to 100 Hz and 200 to 300 Hz may be both determined as reference frequency bands. Finally, one of the two reference frequency bands may be selected, and weighted summation may be performed on a first predicted mask value corresponding to the selected reference frequency band and the first predicted mask value corresponding to the first frequency band, to obtain a second predicted mask value corresponding to the frequency point of 120 Hz. In this case, a center frequency point of the reference frequency band of 20 to 100 Hz is 50 Hz, and the frequency point of 120 Hz is 70 Hz away from the center frequency point; a center frequency point of the frequency band of 100 to 200 Hz is 150 Hz, and the frequency point of 120 Hz is 30 Hz away from the center frequency point; and a center frequency point of the reference frequency band of 200 to 300 Hz is 250 Hz, and the frequency point of 120 Hz is 130 Hz away from the center frequency point. Because a weight of the first predicted mask value may be positively correlated with a distance between the frequency point and the center frequency point of the frequency band, in the process of determining the second predicted mask value corresponding to the frequency point of 120 Hz, a weight of a first predicted mask value corresponding to the reference frequency band of 200 to 300 Hz may be greater than a weight of a first predicted mask value corresponding to the reference frequency band of 20 to 100 Hz; and similarly, the weight of the first predicted mask corresponding to the reference frequency band of 20 to 100 Hz may be greater than a weight of a first predicted mask value corresponding to the frequency band of 100 to 200 Hz.

Determining the second predicted mask value corresponding to each frequency point in the frequency domain in one of the foregoing methods can accurately represent an impact degree of the distance between the frequency point and the center frequency point on the second predicted mask value of the frequency point, so that accuracy of the determined second predicted mask value can be improved, to facilitate accurately determining the loss value based on the accurate second predicted mask value.

In step 1042A, the loss value may be determined based on the second predicted mask value, the first amplitude, and the corrected second amplitude that are corresponding to each frequency point.

For example, after determining the second predicted mask value corresponding to each frequency point, the loss value may be determined based on the second predicted mask value corresponding to each frequency point, and the first amplitude value and the corrected second amplitude corresponding to the frequency point.

In one or more arrangements, in the process of determining the loss value in the frequency domain in the foregoing first solution, there may be the following two implementations: The first implementation may include obtaining the loss value in the frequency domain through calculation based on the amplitude corresponding to each frequency point in the frequency domain; and the second implementation may include obtaining the loss value in the frequency domain through calculation based on the mask corresponding to each frequency point in the frequency domain.

The following separately describes the two example implementations corresponding to the first solution for determining the loss value.

The following describes an example first implementation corresponding to the first solution for determining the loss value. FIG. 3C is a schematic flowchart of steps 10421A and 10422A of an example training method for a speech enhancement model. Based on FIG. 3B, step 1042A shown in FIG. 3C may be implemented through steps 10421A and 10422A. The following provides descriptions with reference to steps 10421A and 10422A shown in FIG. 3C.

In step 10421A, the second predicted mask value and the first amplitude corresponding to each frequency point may be multiplied to obtain a third amplitude corresponding to each frequency point.

For example, FIG. 4A is a schematic flowchart of an example first implementation of determining a loss value corresponding to frequency domain. The Frequency domain dot product shown in FIG. 4A may be implemented in the following manner: In the process of determining the loss value in the frequency domain, the second predicted mask value $G_i$ corresponding to each frequency may be multiplied by the first amplitude $|x_i|$ corresponding to the frequency point to obtain a third amplitude $G_i|x_i|$ corresponding to the frequency point, where $1 \leq i \leq I$, and $I$ represents a total quantity of frequency points.

In step 10422A, the third amplitude and the corrected second amplitude corresponding to each frequency point may be substituted into the first target loss function for calculation to obtain the loss value.

For example, referring to FIG. 4A, after obtaining the third amplitude corresponding to each frequency point, the third amplitude corresponding to each frequency point and the corrected second amplitude corresponding to the frequency point may be substituted into the first target loss function for calculation to obtain the loss value.

The first target loss function may include but is not limited to: a mean square error (MSE) function, an MSE function based on exponential weighting, an MSE function based on logarithmic weighting, a mean absolute error (MAE) function, and a cross entropy loss function. The first target loss function may alternatively be a weighted combination of a plurality of loss functions, such as a weighted combination of the MSE function and the MAE function.

An example in which the first target loss function is the MSE function is used. The first target loss function may be calculated based on the following formula:

$$L1 = \frac{1}{I}\sum_{i=1}^{I}(|si|\cos(\theta_{si} - \theta_{xi}) - G_i|xi|)^2 \qquad \text{Formula 3}$$

L1 represents the first target loss function, $|si|\cos(\theta_{si}-\theta_{xi})$ represents the corrected second amplitude corresponding to the $i^{th}$ frequency point, $G_i|xi|$ represents the third amplitude corresponding to the $i^{th}$ frequency point, and I represents the total quantity of frequency points.

The loss value can be obtained by substituting the corrected second amplitude and the third amplitude corresponding to each frequency point into the foregoing Formula 3 for calculation. In the foregoing manner, the amplitude and the phase of the speech signal can be both integrated into the loss value, to better guide the speech enhancement model in learning.

The following describes an example second implementation of determining the loss value. FIG. 3D is a schematic flowchart of steps 10423A and 10424A of an example training method for a speech enhancement model. Based on FIG. 3B, step 1042A shown in FIG. 3D may alternatively be implemented through steps 10423A and 10424A. The method shown in FIG. 3D and the method shown in FIG. 3C are two concurrent methods. The following provides descriptions with reference to steps 10423A and 10424A shown in FIG. 3D.

In step 10423A, a ratio of the corrected second amplitude corresponding to each frequency point to the first amplitude corresponding to each frequency point may be determined as the first target mask value corresponding to each frequency point.

Figure 4B:
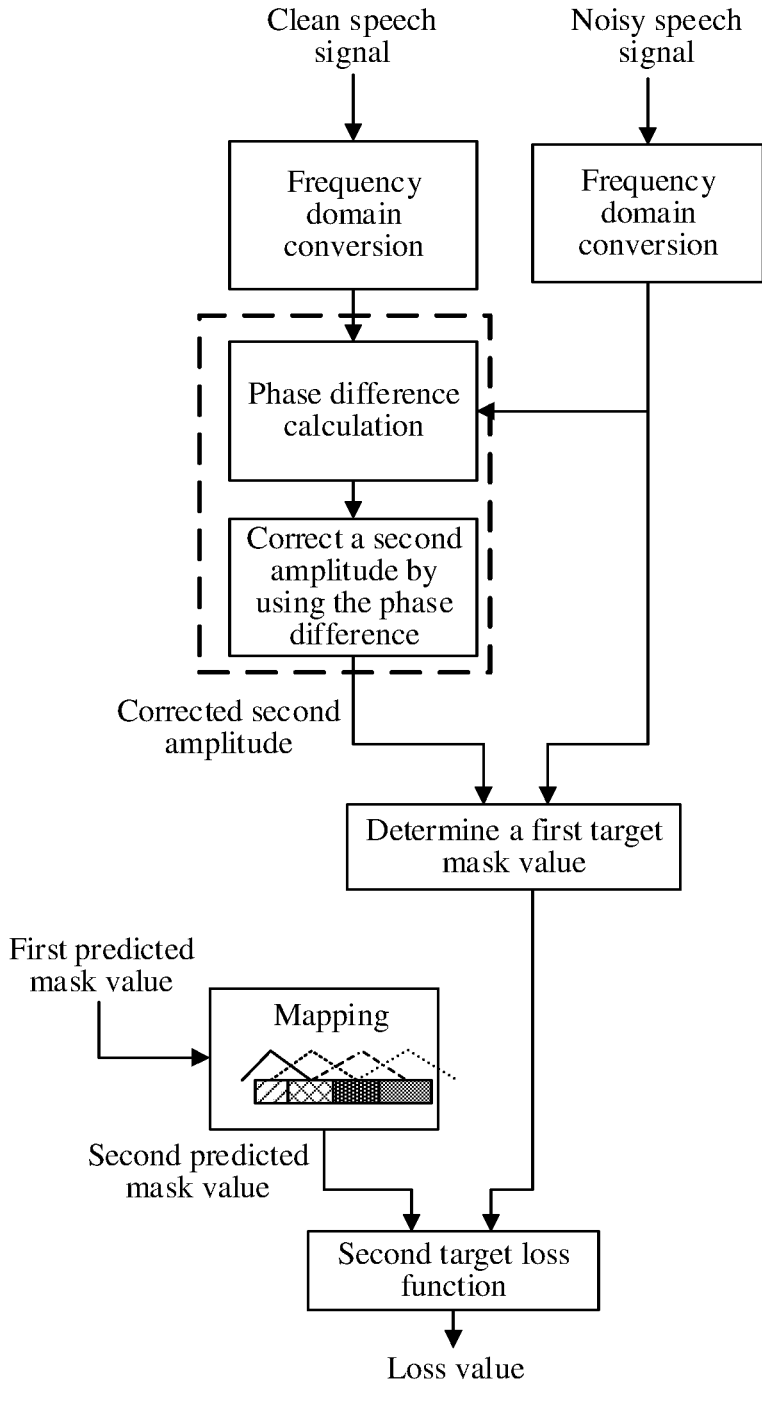
FIG. 4B is a schematic flowchart of an example second implementation of determining a loss value corresponding to frequency domain according to one or more aspects described herein.

For example, FIG. 4B is a schematic flowchart of an example second implementation of determining a loss value corresponding to frequency domain. As shown in FIG. 4B, in the process of determining the loss value of the frequency domain, a ratio of the corrected second amplitude corresponding to each frequency point to the first amplitude corresponding to the frequency point may be determined as the first target mask value corresponding to each frequency point.

For example, the first target mask value may be calculated based on the following formula:

$$M1(i) = \frac{|si|\cos(\theta_{si} - \theta_{xi})}{|xi|} \qquad \text{Formula 4}$$

M1(i) represents the first target mask value corresponding to the $i^{th}$ frequency point, $|si|\cos(\theta_{si}-\theta_{xi})$ represents the corrected second amplitude corresponding to the $i^{th}$ frequency point, and $|xi|$ represents the first amplitude corresponding to the $i^{th}$ frequency point.

In step 10424A, the second predicted mask value corresponding to each frequency point and the first target mask value corresponding to the frequency point may be substituted into the second target loss function for calculation to obtain the loss value.

For example, referring to FIG. 4B, after determining the first target mask value corresponding to each frequency point, the first target mask value corresponding to each frequency point and the second predicted mask value corresponding to the frequency point may be substituted into the second target loss function for calculation to obtain the loss value. An example in which the second target loss function is the MSE function is used. For details, refer to descriptions of the foregoing Formula 3.

For example, the second target loss function may include but is not limited to: the MSE function, the MSE function based on exponential weighting, the MSE function based on logarithmic weighting, the MAE function, and the cross entropy loss function. The second target loss function may alternatively be a weighted combination of a plurality of loss functions, such as a weighted combination of the MSE function and the MAE function.

In the foregoing manner, the amplitude and the phase of the speech signal can be both integrated into the loss value, to better guide the speech enhancement model in learning.

The following provides descriptions of the example second solution for determining the loss value. FIG. 3E is a schematic flowchart of steps 1041B to 1044B of an example training method for a speech enhancement model. Based on FIG. 3A, step 104 shown in FIG. 3E may alternatively be implemented through steps 1041B to 1044B. The method shown in FIG. 3E and the method shown in FIG. 3B may be two concurrent implementations in step 104. The following provides descriptions with reference to steps 1041B to 1044B shown in FIG. 3E.

In step 1041B, the first amplitude and the corrected second amplitude corresponding to each frequency point may be mapped to the frequency band corresponding to the auditory domain.

For example, in the process of determining the loss function, the first amplitude and the corrected second amplitude corresponding to each frequency point may be first mapped to the frequency band corresponding to the auditory domain.

In some arrangements, step 1041B may be implemented in the following manner: the second frequency band to which each frequency point belongs in the auditory domain is determined; and the first amplitude and the corrected second amplitude that are corresponding to each frequency point are mapped to the second frequency band to which the frequency point belongs in the auditory domain.

For example, in the process of mapping the first value and the corrected second amplitude corresponding to each frequency point, first, a frequency band to which each frequency point belongs in the auditory domain (such as the Bark domain and the Mel domain) may be determined. That is, the second frequency band to which each frequency point belongs in the auditory domain may be determined. Second, the first amplitude and the corrected second amplitude corresponding to each frequency may be mapped to the second frequency band to which the frequency point belongs in the auditory domain.

For example, when the frequency point is 120 Hz, it can be learned from Table 1 that the frequency point of 120 Hz belongs to a frequency band of 100 to 200 Hz in the Bark domain, so that the frequency band of 100 to 200 Hz may be determined as the second frequency band, and a first amplitude and a corrected second amplitude corresponding to the frequency point of 120 Hz may be mapped to the second frequency band.

Because a quantity of frequency bands included in the auditory domain is less than a quantity of frequency points in the frequency domain, first amplitudes and corrected second amplitudes corresponding to a plurality of frequency points can be combined into first amplitudes and corrected second amplitudes corresponding to a small quantity of frequency bands by mapping the first amplitudes and the corrected second amplitudes corresponding to the frequency points to corresponding frequency bands in the auditory domain. In this way, the frequency band combination may be implemented through this mapping manner, and dimensions of to-be-processed information may be effectively reduced, so that computing resources can be effectively reduced in the process of calculating the loss value.

In step 1042B, first energy corresponding to each frequency band may be determined based on the first amplitude mapped to each frequency band.

For example, after mapping the first amplitude corresponding to each frequency point to the corresponding frequency band in the auditory domain, the first energy corresponding to each frequency band may be determined based on the first amplitude mapped to each frequency band. The first energy may be a weighted summation result of the following parameters: squares of first amplitudes mapped to each frequency bands.

Energy corresponding to a frequency point may be a square of an amplitude corresponding to the frequency point, and first energy corresponding to a frequency band may be a weighted summation result of squares of all first amplitudes included in the frequency band.

In one or more examples, a first energy corresponding to each frequency band may be calculated based on the following formula:

$$E_1 = \sum_{p=1}^{P} w_p E_p \qquad \text{Formula 5}$$

$E_1$ represents the first energy corresponding to each frequency band, $w_p$ represents a weight of energy corresponding to a first amplitude corresponding to a $p^{th}$ frequency point in the frequency band, Ep represents the energy corresponding to the first amplitude corresponding to the $p^{th}$ frequency point in the frequency band (that is, a square of the first amplitude corresponding to the $p^{th}$ frequency point), and P is a quantity of frequency points included in the frequency band.

A weight corresponding to a square of each first amplitude may be obtained through average distribution. To be specific, when the frequency band includes P frequency points, the weight of the square of the first amplitude corresponding to each frequency point may be 1/P. The weight corresponding to the square of each first amplitude can alternatively be determined based on a distance between a frequency point corresponding to the first amplitude and a center frequency point of the frequency band. In this case, a weight of the square of the first amplitude corresponding to the $p^{th}$ frequency point in the frequency band may be calculated based on the following formula:

$$w_p = \frac{\alpha}{|f_p - f_c|} \qquad \text{Formula 6}$$

$w_p$ represents the weight of the square of the first amplitude corresponding to the $p^{th}$ frequency point in the frequency band, a is a constant, $f_p$ represents the $p^{th}$ frequency point in a frequency band, and $f_c$ represents a center frequency point of the frequency band.

In step 1043B, second energy corresponding to each frequency point may be determined based on the corrected second amplitude mapped to each frequency point.

For example, after mapping the corrected second amplitude corresponding to each frequency point to the corresponding frequency band in the auditory domain, second energy corresponding to each frequency band may be determined based on the corrected second amplitude mapped to each frequency band. The second energy may be a weighted summation result of the following parameters: squares of corrected second amplitudes mapped to each frequency band.

The second energy corresponding to the frequency band may be the weighted summation result of the squares of all corrected second amplitudes included in the frequency band. A manner of calculating the second energy corresponding to each frequency band may be similar to the manner for calculating the first energy corresponding to each frequency band. Accordingly, details of such a process are not described again.

In step 1044B, the loss value is determined based on the first predicted mask value, the first energy, and the second energy that are corresponding to each frequency band.

In one or more examples, after determining the first energy and the second energy corresponding to each frequency band, the loss value may be determined based on the first predicted mask value corresponding to each frequency band, the first energy and the second energy corresponding to the frequency band.

According to one or more aspects, the process of determining the loss value in the auditory domain in the second solution may be performed according to the following two example implementations: The first implementation may include obtaining the loss value in the auditory domain through calculation based on the mask corresponding to each frequency band in the auditory domain; and the second implementation may include obtaining the loss value in the auditory domain through calculation based on energy information corresponding to each frequency band in the auditory domain.

The following separately describes the two example implementations corresponding to the second solution for determining the loss value.

The following describes an example first implementation corresponding to the second solution for determining the loss value. FIG. 3F is a schematic flowchart of steps 10441B and 10442B of an example training method for a speech enhancement model. Based on FIG. 3E, step 1044B shown in FIG. 3F may be implemented through steps 10441B and 10422B. The following provides descriptions with reference to steps 10441B and 10422B shown in FIG. 3F.

In step 10441B, a second target mask value corresponding to each frequency band may be determined based on the first energy and the second energy that are corresponding to each frequency band.

Figure 4C:
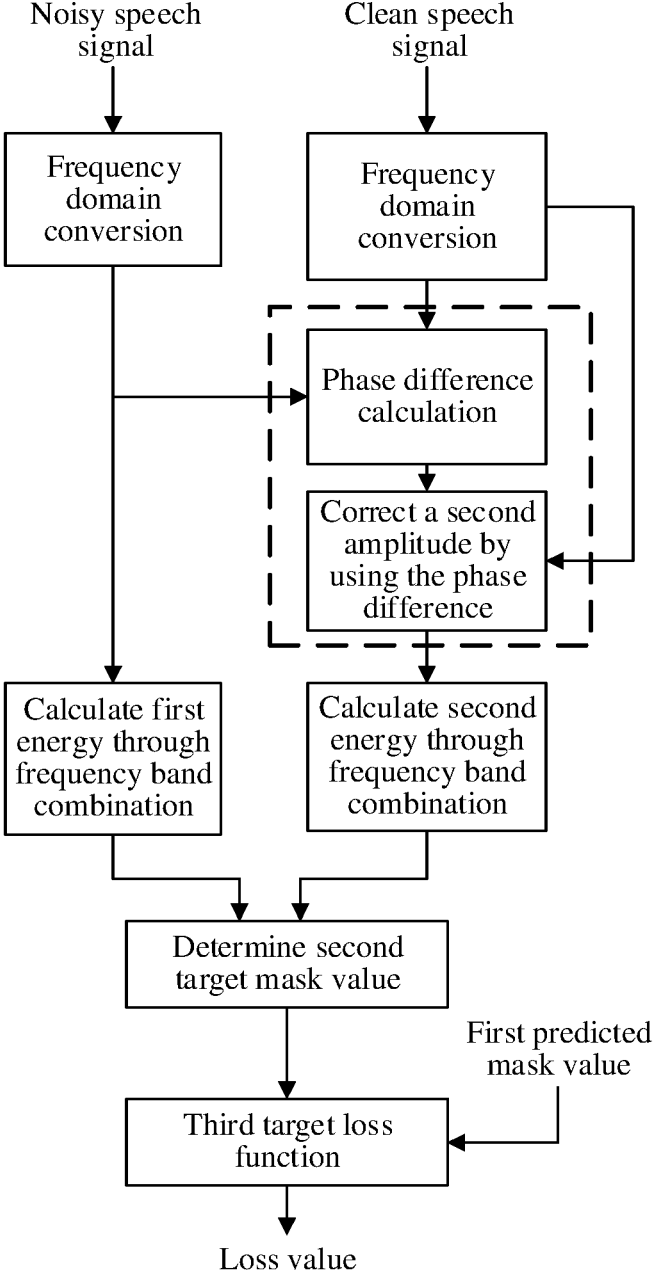
FIG. 4C is a schematic flowchart of an example first implementation of determining a loss value corresponding to auditory domain according to one or more aspects described herein.

For example, FIG. 4C is a schematic flowchart of an example first implementation of determining a loss value corresponding to an auditory domain. As shown in FIG. 4C, in the process of determining the loss value in the auditory domain, the second target mask value corresponding to each frequency band may be determined based on the first energy and the second energy corresponding to each frequency band.

In some arrangements, step 10441B may be implemented in the following manner: A ratio of the second energy corresponding to the frequency band to the first energy corresponding to the frequency band may be determined as the second target mask value corresponding to the frequency band.

For example, a ratio of the second energy corresponding to each frequency band to the first energy corresponding to each frequency band may be determined as the second target mask value corresponding to the frequency band. The second target mask value may be calculated based on the following formula:

$$M2 = \frac{E2}{E1} \qquad \text{Formula 7}$$

M2 represents the second target mask value corresponding to each frequency point, E2 represents the second energy corresponding to the frequency band, and E1 represents the first energy corresponding to the frequency band.

In some arrangements, step 10441B may be implemented in the following manner: A difference between the first energy and the second energy corresponding to the frequency band may be determined as a third energy corresponding to the frequency band. A first summation result may be obtained by summing a square of the second energy corresponding to the frequency band and a square of the third energy corresponding to the frequency band, and a ratio of the square of the second energy to the first summation result may be determined as the second target mask value corresponding to the frequency band.

For example, first, the difference between the first energy and the second energy the corresponding to each frequency band may be determined as the third energy corresponding to the frequency band. Second, the first summation result may be obtained by summing the square of the second energy and the square of the third energy corresponding to the frequency band. Finally, the ratio of the square of the second energy corresponding to the frequency band to the first summation result may be determined as the second target mask value corresponding to the frequency band. The second target mask value corresponding to each frequency band may be calculated based on the following formula:

$$M2 = \frac{(E2)^2}{(E2)^2 + (E3)^2} \qquad \text{Formula 8}$$

M2 represents the second target mask value corresponding to each frequency band, E2 represents the second energy corresponding to the frequency band, E3 represents the third energy corresponding to the frequency band, E3 is the difference between the first energy and the second energy that are corresponding to the frequency band, that is, E1–E2, and E1 represents the first energy corresponding to frequency band.

In step 10442B, the first predicted mask value corresponding to each frequency band and the second target mask value corresponding to the frequency band may be substituted into the third target loss function for calculation to obtain the loss value.

For example, referring to FIG. 4C, after determining the second target mask value corresponding to each frequency band, the first predicted mask value corresponding to each frequency band and the second target mask value corresponding to the frequency band may be substituted into the third target loss function for calculation to obtain the loss value.

For example, the third target loss function may include but is not limited to: the MSE function, the MSE function based on exponential weighting, the MSE function based on logarithmic weighting, the MAE function, and a cross entropy loss function. The third target loss function may alternatively be a weighted combination of a plurality of loss functions, such as a weighted combination of the MSE function and the MAE function. In the foregoing manner, the amplitude and the phase of the speech signal can be integrated into the loss value, so that the speech enhancement model can be better guided to learn.

The following describes an example second implementation corresponding to the second solution for determining the loss value. FIG. 3G is a schematic flowchart of steps 10443B and 10444B of an example training method for a speech enhancement model. Based on FIG. 3E, step 1044B shown in FIG. 3G may alternatively be implemented through steps 10443B and 10444B. The method shown in FIG. 3G and the method shown in FIG. 3F may be two concurrent methods. The following provides descriptions with reference to steps 10443B and 10444B shown in FIG. 3G.

In step 10443B, the first predicted mask value corresponding to each frequency band and the first energy corresponding to the frequency band may be multiplied to obtain fourth energy corresponding to each frequency band.

Figure 4D:
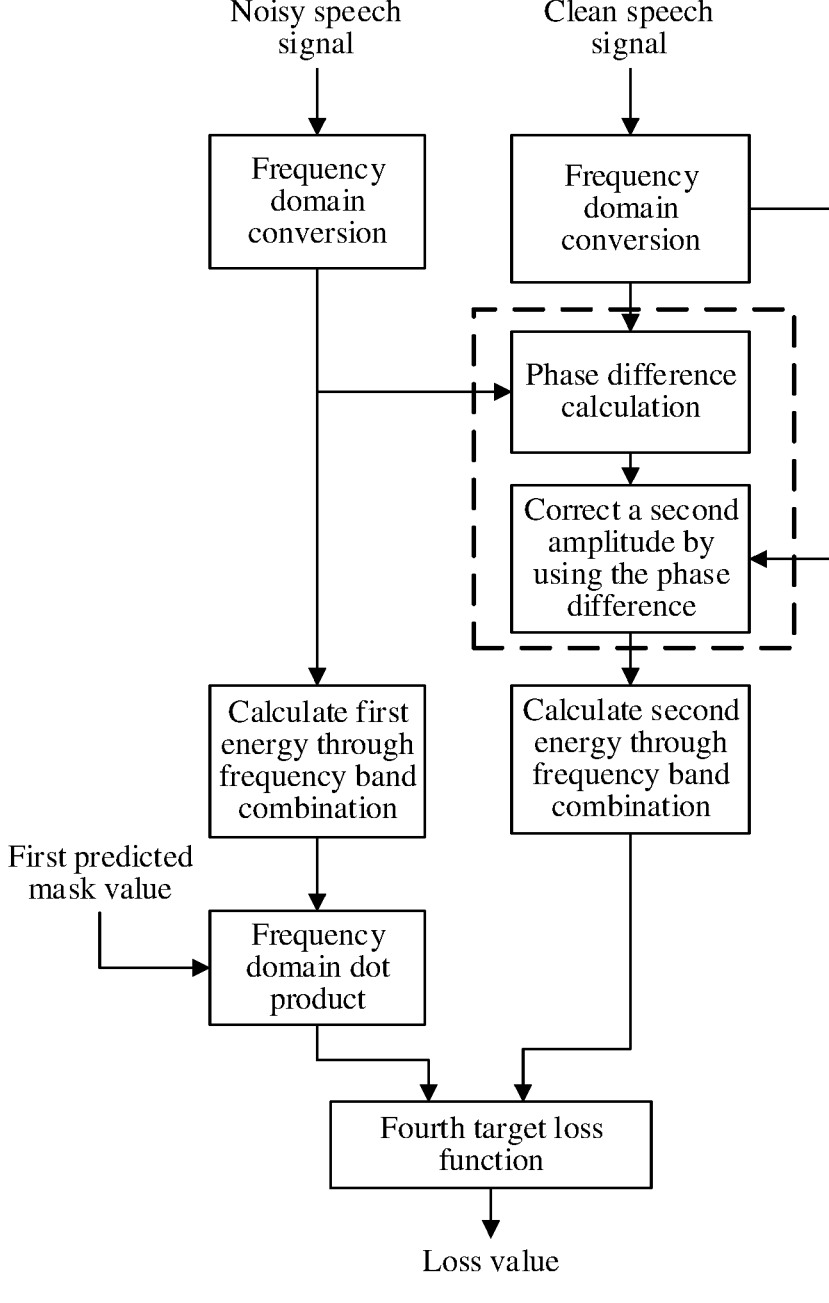
FIG. 4D is a schematic flowchart of an example second implementation of determining a loss value corresponding to auditory domain according to one or more aspects described herein.

For example, FIG. 4D is a schematic flowchart of the example second implementation of determining a loss value corresponding to auditory domain. As shown in FIG. 4D, in the process of determining the loss value in the auditory domain, the first predicted mask value corresponding to each frequency band and the first energy corresponding to the frequency band may be multiplied to obtain the fourth energy corresponding to each frequency band.

In step 10444B, the second energy corresponding to each frequency band and the fourth energy corresponding to the frequency band may be substituted into the fourth target loss function for calculation to obtain the loss value.

For example, referring to FIG. 4D, after obtaining the fourth energy corresponding to each frequency band, the second energy corresponding to each frequency band and the fourth energy corresponding to the frequency band may be substituted into the fourth target loss function for calculation to obtain the loss value. The fourth target loss function may include but is not limited to: the MSE function, the MSE function based on exponential weighting, the MSE function based on logarithmic weighting, the MAE function, and the cross entropy loss function. The fourth target loss function may alternatively be a weighted combination of a plurality of loss functions, such as a weighted combination of the MSE function and the MAE function.

In the foregoing manner, the amplitude and the phase of the speech signal can be both integrated into the loss value, to better guide the speech enhancement model in learning.

In step 105, backpropagation may be performed in the speech enhancement model based on the loss value, to update parameters of the speech enhancement model.

For example, after obtaining the loss value, backpropagation may be performed in the speech enhancement model based on the loss value, to update the parameters of the speech enhancement model.

Following the above, an example in which the speech enhancement model is a convolutional neural network (CNN) model is used. The convolutional neural network model may include a plurality of cascaded convolutional layers. After obtaining the loss value through calculation, a backpropagation (BP) algorithm may be used to backpropagate the loss value in a direction from an output layer to an input layer, and parameters of the convolutional layer may be calculated by using a gradient descent algorithm during the backpropagation process.

The foregoing steps 101 to 105 may be repeatedly performed until a set quantity of training times is reached, or the loss value is less than a set threshold. Training of the speech enhancement model may be ended, to obtain a trained speech enhancement model. Then, the trained speech enhancement model can be used for speech enhancement.

According to one or more aspects, the amplitude of the clean speech signal at each frequency point may be corrected based on the phase difference between the noisy speech signal and the clean speech signal at each frequency point. The loss value may be determined based on the amplitude of the corrected clean speech signal, the amplitude of the noisy speech signal, and the plurality of first predicted mask values output by the speech enhancement model. Therefore, the phase and the amplitude of the speech signal may be fully considered in the process of calculating the loss value, so that the speech enhancement model is enabled to learn comprehensively based on the loss value integrating the phase and the amplitude. This breaks through the technical barrier that phase cannot be introduced to the auditory domain-based system in the related art. The enhanced speech signal determined based on the predicted mask value output by the trained speech enhancement model might not only be close to the clean speech signal in amplitude, but also be close to the clean speech signal in phase, to improve the noise reduction effect.

The following describes an example speech enhancement processing method and an example implementation of the electronic device. It may be understood that the following method may be independently performed by the foregoing terminal 401 or the foregoing server 200, or may be collaboratively performed by the foregoing terminal 401 and the foregoing server 200.

FIG. 3H is a schematic flowchart of an example speech enhancement processing method. The following provides descriptions with reference to steps 201 to 203 shown in FIG. 3H.

In step 201, a to-be-processed speech feature of a to-be-processed speech signal may be obtained, and a speech enhancement model may be invoked, to obtain a plurality of third predicted mask values in auditory domain.

For example, the to-be-processed speech feature may be obtained in the following manner: First, the to-be-processed speech signal may be transformed from time domain to frequency domain, to obtain a spectrum of the to-be-processed speech signal. The spectrum may include an amplitude spectrum and a phase spectrum. Amplitudes corresponding to a plurality of frequency points in the frequency domain may be read from the amplitude spectrum. Frequency of a frequency point may be related to a quantity of sampling times, and may be specifically calculated based on the foregoing formula 1. A corresponding phase of the plurality of frequency points may be read from the phase spectrum. Then, frequency band combination may be performed on third amplitudes corresponding to the plurality of frequency points of the to-be-processed speech signal in the frequency domain, to obtain a plurality of third amplitudes corresponding to the to-be-processed speech signal in the auditory domain, and the frequency band combination may be implemented in the following example manner: For each frequency point, a third amplitude of the frequency point may be used as an amplitude of the corresponding frequency point in the auditory domain, to uniformly map amplitudes of frequency points with discrete amplitude spectrums to the auditory domain. Finally, feature extraction may be performed based on the plurality of third amplitudes corresponding to the to-be-processed speech signal in the auditory domain, to obtain the to-be-processed speech feature. For example, the plurality of third amplitudes may be combined into a feature vector representing a noisy speech feature.

The speech enhancement model may be trained in the training method for a speech enhancement model, and a value range of a mask value may be a closed interval between 0 and 1.

In step 202, mapping processing may be performed based on a plurality of third predicted mask values in the auditory domain to obtain a mapping processing result.

For example, a plurality of mask values in the auditory domain may be in a one-to-one correspondence with a plurality of frequency points in the auditory domain. After obtaining the plurality of third predicted mask values in the auditory domain, first, the plurality of third predicted mask values in the auditory domain may be mapped to obtain the mapping processing result. The mapping processing result may include the mask values corresponding to the foregoing plurality of frequency points in the frequency domain. The mapping processing manner herein may be similar to the foregoing mapping processing manner of step 1041A. For details not described below, refer to the foregoing descriptions of step 1041A.

In some arrangements, step 202 may be implemented in the following copying manner: for each frequency point: In the plurality of pre-divided frequency bands in the auditory domain (for example, pre-divided frequency bands in BARK domain or Mel domain), the frequency band to which the frequency point belongs in the auditory domain (referred to as the frequency band for short below) may be determined, and a third predicted mask value corresponding to the frequency band may be determined as a fourth predicted mask value corresponding to the frequency point, namely, the mapping processing result.

In some arrangements, step 202 may be further implemented in the following linear weighting manner: In a plurality of pre-divided frequency bands in the auditory domain, a frequency band to which a frequency point belongs in the auditory domain may be determined, and at least one reference frequency band (for example, at least one of a reference frequency band lower than the frequency band and a reference frequency band higher than the frequency band) adjacent to the frequency band in the auditory domain may be determined. Weighted summation may be performed on the third predicted mask value corresponding to the frequency band and a third predicted mask value corresponding to the at least one reference frequency band, to obtain the fourth predicted mask value corresponding to the frequency point, namely, the mapping processing result.

In step 203, signal reconstruction may be performed based on the mapping processing result and the phase spectrum of the to-be-processed speech signal, to obtain the enhanced speech signal.

For example, after obtaining mask values corresponding to the plurality of frequency points in the frequency domain, the fourth predicted mask values corresponding to the plurality of frequency points in the frequency domain and an amplitude spectrum of the to-be-processed speech signal may be multiplied. To be specific, the fourth predicted mask values of the frequency points and amplitudes of corresponding frequency points in the amplitude spectrum may be multiplied, and amplitudes of other frequency points in the amplitude spectrum may remain unchanged, to obtain an enhanced amplitude spectrum. Signal reconstruction may be performed based on the enhanced amplitude spectrum and the phase spectrum of the to-be-processed speech signal, for example, inverse Fourier transform (IFFT) may be performed, to obtain the enhanced speech signal, that is, the speech signal after noise reduction.

According to one or more aspects, because the speech enhancement model used for speech enhancement processing may be obtained through training based on the loss value that integrates the phase and the amplitude, the enhanced speech signal determined based on the mask value obtained through speech enhancement processing based on the speech enhancement model might not only be close to the clean speech signal in amplitude, but may also be close to the clean speech signal in phase, so that the noise in the to-be-processed speech signal can be effectively reduced, and a signal-to-noise ratio of the speech signal can be improved, to improve the noise reduction effect.

The following describes an exemplary speech enhancement processing application scenario.

FIG. 5 is a schematic diagram of example speech enhancement processing in a game client. As shown in FIG. 5, the game client integrates a game voice SDK. A core engine algorithm of the game voice SDK may include one or more aspects of the speech enhancement processing methods based on deep learning described herein. The game voice SDK can provide a noise suppression enabling interface for the game client.

FIG. 5 illustrates a microphone control and a speaker control 501 in the game client. A user can enable a speech enhancement function, that is, enable a noise suppression function, by operating on the microphone control and/or the speaker control. For example, when the user uses the game client, if the user controls the microphone control and/or the speaker control of the game client through touching, in response to the user's touch operation on the microphone control and/or the speaker control, a terminal may obtain a speech signal that is generated by the user in the game client and that is collected by the microphone control, invoke the noise suppression enabling interface in the game voice SDK, and execute the speech enhancement processing, to obtain an enhanced speech signal. The terminal can then send the enhanced speech signal to other players, and other players can play the enhanced speech signal by using the speaker control in the game client. In this way, environmental noise in the speech signal collected by a microphone can be effectively suppressed, to implement high-quality voice call between users and players in the game client.

FIG. 6 is a schematic diagram of example speech enhancement processing in a voice call process. As shown in FIG. 6, during a voice call between a user 1 using a terminal 1 and a user 2 using a terminal 2, voice signals collected by microphones of the terminal 1 and the terminal 2 may include various types of environmental noise in addition to human voice signals emitted by the users. By applying the speech enhancement processing method based on deep learning described herein on the terminal 1 and the terminal 2, the environmental noise may be effectively suppressed in the speech signals collected by the microphone, and only the human voice signal may be transmitted to a communication peer, to improve quality of the voice call.

In some arrangements, aspects of speech enhancement processing based on deep learning described herein may additionally or alternatively be used in the following scenarios:

(1) Video call scenario: A user makes a video call with another user by using a terminal device in a public place, and various types of noise may be included in the environment. By applying speech enhancement processing based on deep learning, environmental noise in a speech signal can effectively suppressed, a human voice signal can be effectively retained, to improve the user experience of the video call, and improve the user's communication efficiency through the video call.

(2) Online meeting scenario: A plurality of users participate in an online meeting through an online meeting client installed on a terminal device. Because the users are in diversified environments, the speech signals collected by microphones may be mixed with environmental noise. By applying speech enhancement processing based on deep learning on the terminal device, the noise in the speech signals can be reduced, user experience of participating in the online meeting can be improved, and work efficiency of the online meeting can be improved.

The following describes example training and application processes of a speech enhancement model in speech enhancement processing. FIG. 7 is a schematic diagram of example training and application processes of a speech enhancement model. An example training method and an application method of the speech enhancement model shown in FIG. 7 may be executed by a terminal or a server separately, or by a terminal and a server collaboratively. An example in which the training method and the application method are executed by a server may be used.

As shown in FIG. 7, steps 701 to 704 may be training processes of the speech enhancement model, and steps 705 to 710 may be application processes of the speech enhancement model. The following provides descriptions with reference to all steps shown in FIG. 7.

In step 701, time-frequency conversion from time domain to frequency domain may be separately performed on a clean speech signal and a noisy speech signal, to obtain a first amplitude and first phase corresponding to a plurality of frequency points of the noisy speech signal in the frequency domain, and obtain a second amplitude and second phase corresponding to a plurality of frequency points of the clean speech signal in the frequency domain.

In step 702, frequency band combination may be performed on first amplitudes corresponding to the noisy speech signal at the plurality of frequency points in the frequency domain, to map the first amplitudes corresponding to the plurality of frequency points to a plurality of frequency bands in auditory domain; and frequency band combination may be performed on second amplitudes corresponding to the clean speech signal at the plurality of frequency points in the frequency domain, to map the second amplitudes corresponding to the plurality of frequency points to a plurality of frequency bands in the auditory domain. The auditory domain may include but is not limited to Bark domain and Mel domain.

In step 703, feature extraction may be performed on the first amplitude corresponding to the noisy speech signal in the auditory domain to obtain a noisy speech feature. For example, logarithmic or exponential weighting may be used for the first amplitude to reduce a dynamic range of a value of the first amplitude. Alternatively, the first amplitude may be spliced with spectral information of adjacent noisy speech signal frames in time sequence to enlarge a time domain view.

In step 704, the speech enhancement model may be invoked based on the noisy speech feature, to perform the speech enhancement processing, to obtain a plurality of first predicted mask values in the auditory domain.

After the first predicted mask value is obtained, a loss value may be determined based on the first predicted mask value. One or more aspects may provide two exemplary solutions for determining the loss value. An example first solution may include mapping the plurality of first predicted mask values in the auditory domain to the frequency domain, and determining the loss value corresponding to the frequency domain based on a plurality of second predicted mask values in the frequency domain, and a first amplitude and a corrected second amplitude corresponding to each frequency point in the frequency domain. An example second solution may include mapping a first amplitude and a corrected second amplitude corresponding to each frequency point in the frequency domain to the auditory domain, determining a corresponding second target mask value in the auditory domain based on a first amplitude and a corrected second amplitude corresponding to the auditory domain, and determining the loss value corresponding to the auditory domain based on the second target mask value in the auditory domain and the first predicted mask value in the auditory domain. For the process of determining the loss value, details may correspond to the foregoing steps 1042A and 1044B. According, those details are not repeated here.

After the loss value is determined in any one of the foregoing solutions, backpropagation may be performed in the speech enhancement model based on the loss value to update parameters of the speech enhancement model.

The foregoing steps 701 to 704 may be repeatedly performed until a set quantity of training times is reached, or the loss value is less than a set threshold. Training of the speech enhancement model may be ended, to obtain a trained speech enhancement model. Then, the trained speech enhancement model can be used for speech enhancement.

The following steps 705 to 710 are example application processes of the speech enhancement model.

In step 705, time-frequency conversion from time domain to frequency domain may be performed on the to-be-processed speech signal, to obtain amplitudes and phase corresponding to a to-be-processed speech signal at a plurality of frequency points in the frequency domain.

In step 706, frequency band combination may be performed on the amplitudes corresponding to the to-be-processed speech signal at the plurality of frequency points in the frequency domain, to map the amplitudes to a plurality of frequency bands in the auditory domain.

Due to a large scale and high algorithmic complexity of the speech enhancement model based on deep learning, in some cases, a voice enhancement requirement of a terminal may be high. To apply the speech enhancement model based on deep learning to the terminal, deep learning based on the auditory domain can effectively reduce dimensions of information to be processed through frequency band combination based on different sensitivities of the human ear to different frequencies, thereby reducing the scale of the speech enhancement model, so that the speech enhancement model can be successfully deployed to the terminal.

In step 707, feature extraction may be performed on the amplitude corresponding to the to-be-processed speech signal in the auditory domain to obtain a to-be-processed speech feature.

In step 708, the speech enhancement model may be invoked based on the to-be-processed speech feature to perform the speech enhancement processing, to obtain a plurality of mask values in the auditory domain.

In step 709, the plurality of mask values in the auditory domain may be mapped to obtain mask values corresponding to all frequency points in the frequency domain.

In step 710, signal reconstruction may be performed (for example, an inverse Fourier transform) based on the mask values corresponding to the plurality of frequency points in the frequency domain and phase corresponding to the to-beprocessed speech signal at the plurality of frequency points in the frequency domain, to obtain an enhanced speech signal.

Speech enhancement processing described herein can more effectively reduce environmental noise in a speech signal collected by a microphone without increasing computational complexity, to improve a signal-to-noise ratio of the speech, and obtain a clean speech signal, to improve an effect of speech enhancement.

The following continues to describe an exemplary structure in which the training apparatus 233 for a speech enhancement model may be implemented as a software module. In some arrangements, as shown in FIG. 2A, the software module in the training apparatus 233 for a speech enhancement model stored in the memory 230 may include the following modules: the enhancement module 2331, configured to invoke the speech enhancement model based on the noisy speech feature of the noisy speech signal to perform speech enhancement processing, to obtain a plurality of first predicted mask values, the plurality of first predicted mask values having a one-to-one correspondence with the plurality of frequency bands in the auditory domain; the obtaining module 2332, configured to obtain the first amplitude and the first phase corresponding to each frequency point of the noisy speech signal, and the second amplitude and the second phase corresponding to each frequency point of the clean speech signal; the correction module 2333, configured to determine the phase difference between the clean speech signal and the noisy speech signal at each frequency point based on the first amplitude and the second amplitude corresponding to the frequency point, and correcting the second amplitude of the frequency point based on the phase difference of the frequency point, to obtain the second corrected amplitude corresponding to each frequency point; the determining module 2334, configured to determine the loss value based on the plurality of first predicted mask values, and the first amplitude and the corrected second amplitude corresponding to each frequency point; and the update module 2335, configured to perform backpropagation in the speech enhancement model based on the loss value, to update parameters of the speech enhancement model.

In the foregoing processes, the determining module 2334 may be configured to map the plurality of first predicted mask values to obtain the second predicted mask values corresponding to each frequency point, and determine the loss value based on the second predicted mask value, the first amplitude value, and the corrected second amplitude corresponding to each frequency point.

The determining module 2334 may be configured to determine the second predicted mask value corresponding to each frequency point in one of the following manners: A first frequency band to which the frequency point belongs in the auditory domain may be determined, and a first predicted mask value corresponding to the first frequency band may be determined as a second predicted mask value corresponding to the frequency point. Alternatively, a first frequency band to which the frequency point belongs in the auditory domain may be determined, and a reference frequency band adjacent to the first frequency band in the auditory domain may be determined. Weighted summation may be performed on a first predicted mask value corresponding to the first frequency band and a first predicted mask value corresponding to the reference frequency band, to obtain the second predicted mask value corresponding to the frequency point. A weight corresponding to each first predicted mask value may be positively correlated with a distance between the following two elements: the frequency point and a center frequency point of the frequency band corresponding to the first predicted mask value.

The determining module 2334 may be configured to multiply the second predicted mask value corresponding to each frequency point by the first amplitude corresponding to each frequency point, to obtain the third amplitude corresponding to each frequency point, and to substitute the third amplitude corresponding to each frequency point and the corrected second amplitude corresponding to the frequency point into the first target loss function for calculation, to obtain the loss value.

The determining module 2334 may further be configured to determine a ratio of the corrected second amplitude corresponding to each frequency point to the first amplitude corresponding to the frequency point as the first target mask value corresponding to each frequency point; and substitute the second predicted mask value corresponding to each frequency point and the first target mask value corresponding to the frequency point into the second target loss function for calculation, to obtain the loss value.

The determining module 2334 may also be configured to: map the first amplitude and the corrected second amplitude that are corresponding to each frequency point to the corresponding frequency band in the auditory domain; determine the first energy corresponding to each frequency band based on the first amplitude mapped to each frequency band, where the first energy is the weighted summation result of the following parameters: the squares of the first amplitudes mapped to each frequency band; determine the second energy corresponding to each frequency band based on the corrected second amplitude mapped to each frequency band, where the second energy is the weighted summation result of the following parameters: the squares of the corrected second amplitudes mapped to each frequency band; and determine the loss value based on the first predicted mask value, the first energy, and the second energy that are corresponding to each frequency band.

Further, the determining module 2334 may be configured to determine the second frequency band to which each frequency point belongs in the auditory domain; and map the first amplitude and the corrected second amplitude corresponding to each frequency point to the second frequency band to which the frequency point belongs in the auditory domain.

The determining module 2334 may also be configured to determine the second target mask value corresponding to each frequency band based on the first energy and the second energy corresponding to each frequency band; and substitute the first predicted mask value corresponding to each frequency band and the second target mask value corresponding to the frequency band into the third target loss function for calculation, to obtain the loss value.

The determining module 2334 may further be configured to determine the second target mask value corresponding to each frequency band in one of the following example manners: determine a ratio of the second energy to the first energy corresponding to the frequency band as the second target mask value corresponding to the frequency band; or determine the difference between the first energy and the second energy corresponding to the frequency band as the third energy corresponding to the frequency band; and sum the square of the second energy corresponding to the frequency band and the square of the third energy corresponding to the frequency band to obtain the first summation result, and determine the ratio of the square of the second energy to the first summation result as the second target mask value corresponding to the frequency band.

The determining module 2334 may be configured to multiply the first predicted mask value corresponding to each frequency band by the first energy corresponding to the frequency band, to obtain the fourth energy corresponding to each frequency band; and substitute the second energy corresponding to each frequency band and the fourth energy corresponding to the frequency band into the fourth target loss function for calculation, to obtain the loss value.

The following continues to describe an exemplary structure in which the speech enhancement processing apparatus 433 is implemented as a software module. In FIG. 2B, a software module of the speech enhancement processing apparatus 433 stored in the memory 430 may include the following modules: the enhancement module 4331, configured to invoke the speech enhancement model, based on the to-be-processed speech feature of the to-be-processed speech signal to perform speech enhancement processing, to obtain a plurality of third predicted mask values, the plurality of third predicted mask values having a one-to-one correspondence with a plurality of frequency bands in auditory domain, and the speech enhancement model being obtained through training in the training method for a speech enhancement model; the mapping module 4332, configured to perform mapping processing based on the plurality of third predicted mask values to obtain the mapping processing result; and the reconstruction module 4333, configured to perform signal reconstruction based on the mapping processing result and the phase spectrum of the to-be-processed speech signal, to obtain the enhanced speech signal.

The mapping module may be further configured to perform the following processing for each frequency point: determining the frequency band to which the frequency point belongs in the auditory domain, and determining the third predicted mask value corresponding to the frequency band as the fourth predicted mask value corresponding to the frequency point; or determining the frequency band to which the frequency point belongs in the auditory domain, and determining the at least one reference frequency band adjacent to the frequency band in the auditory domain; and performing weighted summation on the third predicted mask value corresponding to the frequency band and the third predicted mask value corresponding to the at least one reference frequency band, to obtain the fourth predicted mask value corresponding to the frequency point.

The reconstruction module may be further configured to: multiply the mask values corresponding to the plurality of frequency points in the frequency domain by an amplitude spectrum of the to-be-processed speech signal after obtaining the mask values corresponding to the plurality of frequency points in frequency domain (e.g., multiplying the mask values of the frequency points by amplitudes of corresponding frequency points in the amplitude spectrum while amplitudes of other frequency points in the amplitude spectrum remains unchanged), to obtain the enhanced amplitude spectrum; and perform an inverse Fourier transform on the enhanced amplitude spectrum and the phase spectrum of the to-be-processed speech signal, to obtain the enhanced speech signal.

Aspects described herein may further provide a computer program product or a computer program. The computer program product or the computer program may include computer instructions. The computer instructions may be stored in a computer-readable storage medium. A processor of a computer device may read the computer instructions from the computer-readable storage medium, and the processor may execute the computer instructions, to enable the computer device to execute a training method for a speech enhancement model or speech enhancement processing.

Aspects described herein may also provide a computer-readable storage medium having executable instructions stored therein. When the executable instructions are executed by a processor, the processor may be caused to perform a training method for a speech enhancement model or speech enhancement processing.

In some embodiments, the computer-readable storage medium may be a memory such as a FRAM, a ROM, a PROM, an EPROM, an EEPROM, a flash memory, a magnetic surface memory, an optical disk, or a CD-ROM. The computer-readable storage medium may alternatively be any device that includes one or any combination of the foregoing memories.

In some arrangements, executable instructions may be in a form of programs, software, software modules, scripts or code, written in any form of programming language (including compiled language or interpretive language, or declarative language or procedural language), and may be deployed in any form, including being deployed as an independent program or as a module, a component, a subroutine, or another unit suitable for use in a computing environment.

For example, the executable instructions may, but not necessarily, correspond to files in a file system, may be stored as a part of a file that stores other programs or data, for example, stored in one or more scripts in a HyperText Markup Language (HTML) document, stored in a single file dedicated to a program in question, or stored in a plurality of cooperative files (for example, files that store one or more modules, subroutines, or parts of code).

For example, executable instructions may be deployed to be executed on an electronic device, or on a plurality of electronic devices located in one place, or on a plurality of electronic devices located in a plurality of places and interconnected through a communication network.

According to aspects described herein, the amplitude of the clean speech signal at each frequency point may be corrected based on the phase difference between the noisy speech signal and the clean speech signal at each frequency point. The loss value may be determined based on the amplitude of the corrected clean speech signal, the amplitude of the noisy speech signal, and the plurality of first predicted mask values output by the speech enhancement model. Therefore, the loss value may be fully integrated with the phase and the amplitude of the speech signal, so that the speech enhancement model is enabled to learn comprehensively based on the loss value integrating the phase and the amplitude. This breaks through a technical barrier in the related art that the phase cannot be introduced to the auditory domain-based system. The enhanced speech signal determined based on the predicted mask value output by the trained speech enhancement model is not only close to the clean speech signal in amplitude, but also close to the clean speech signal in phase, to improve the noise reduction effect.

The foregoing descriptions are merely examples are not intended to limit the scope of protection. Any modification, equivalent replacement, or improvement made without departing from the spirit and principle of the disclosure falls within the scope of protection.

What is claimed is:

1. A training method for a speech enhancement model, performed by an electronic device, the method comprising:

invoking the speech enhancement model based on a noisy speech feature of a noisy speech signal, to perform speech enhancement on the noisy speech signal, to obtain a plurality of first predicted mask values, the plurality of first predicted mask values having a one-to-one correspondence with a plurality of frequency bands in an auditory domain;

obtaining a first amplitude and a first phase corresponding to each frequency point of the noisy speech signal, and a second amplitude and a second phase corresponding to each frequency point of a clean speech signal;

determining a phase difference between the clean speech signal and the noisy speech signal at each frequency point based on the first phase and the second phase corresponding to each frequency point;

correcting the second amplitude corresponding to the frequency point based on the phase difference, to obtain a corrected second amplitude corresponding to each frequency point;

determining a loss value based on the plurality of first predicted mask values, and the first amplitude and the corrected second amplitude corresponding to each frequency point, including:

mapping the plurality of first predicted mask values respectively to obtain second predicted mask values corresponding to each frequency point; and determining the loss value based on the second predicted mask value, the first amplitude, and the corrected second amplitude corresponding to each frequency point; and performing backpropagation in the speech enhancement model based on the loss value, to update parameters of the speech enhancement model.

2. The method according to claim 1, wherein the mapping the plurality of first predicted mask values respectively to obtain second predicted mask values corresponding to each frequency point comprises:

determining the second predicted mask value corresponding to each frequency point in one of the following manners:

determining a first frequency band to which the frequency point belongs in the auditory domain, and determining a first predicted mask value corresponding to the first frequency band as the second predicted mask value corresponding to the frequency point; or determining the first frequency band to which the frequency point belongs in the auditory domain, and determining a reference frequency band adjacent to the first frequency band in the auditory domain; and performing weighted summation on the first predicted mask value corresponding to the first frequency band and a first predicted mask value corresponding to the reference frequency band, to obtain the second predicted mask value corresponding to the frequency point, a weight corresponding to each of the first predicted mask values being positively correlated with a distance between the following two elements: the frequency point and a center frequency point of a frequency band corresponding to the first predicted mask value.

3. The method according to claim 1, wherein the determining the loss value based on the second predicted mask value, the first amplitude, and the corrected second amplitude corresponding to each frequency point further comprises:

multiplying the second predicted mask value corresponding to each frequency point by the first amplitude corresponding to the frequency point, to obtain a third amplitude corresponding to each frequency point; and substituting the third amplitude corresponding to each frequency point and the corrected second amplitude corresponding to the frequency point into a first target loss function for calculation, to obtain the loss value.

4. The method according to claim 1, wherein the determining the loss value based on the second predicted mask value, the first amplitude, and the corrected second amplitude corresponding to each frequency point further comprises:

determining a ratio of the corrected second amplitude corresponding to each frequency point to the first amplitude corresponding to the frequency point as a first target mask value corresponding to each frequency point; and substituting the second predicted mask value corresponding to each frequency point and the first target mask value corresponding to the frequency point into a second target loss function for calculation, to obtain the loss value.

5. The method of claim 1, further comprising:

invoking the speech enhancement model with the updated parameters based on a to-be-processed speech feature of a to-be-processed speech signal, to perform speech enhancement, to obtain a plurality of third predicted mask values, the plurality of third predicted mask values having a one-to-one correspondence with the plurality of frequency bands in the auditory domain;

performing mapping processing based on the plurality of third predicted mask values to obtain a mapping processing result; and performing signal reconstruction based on the mapping processing result and a phase spectrum of the to-be-processed speech signal, to obtain an enhanced speech signal.

6. The method according to claim 5, wherein the mapping processing result comprises a third predicted mask value corresponding to a predicted frequency point of the to-be-processed speech signal; and the performing mapping processing based on the plurality of predicted mask values in the auditory domain to obtain a mapping processing result comprises:

for each frequency point: determining a frequency band to which the frequency point belongs in the auditory domain, and determining a third predicted mask value corresponding to the frequency band as a fourth predicted mask value corresponding to the frequency point; or determining a frequency band to which the frequency point belongs in the auditory domain, and determining at least one reference frequency band adjacent to the frequency band in the auditory domain; and performing weighted summation on the third predicted mask value corresponding to the frequency band and a third predicted mask value corresponding to the at least one reference frequency band, to obtain a fourth predicted mask value corresponding to the frequency point.

7. The method according to claim 6, wherein the performing signal reconstruction processing based on the mapping processing result and a phase spectrum of the to-be-processed speech signal, to obtain an enhanced speech signal comprises:

multiplying mask values corresponding to a plurality of frequency points in a frequency domain by an amplitude spectrum of the to-be-processed speech signal after obtaining the mask values corresponding to the plurality of frequency points in the frequency domain, including multiplying the mask values of the frequency points by amplitudes of corresponding frequency points in the amplitude spectrum, and maintaining amplitudes of other frequency points in the amplitude spectrum unchanged, to obtain an enhanced amplitude spectrum; and performing an inverse Fourier transform on the enhanced amplitude spectrum and the phase spectrum of the to-be-processed speech signal, to obtain an enhanced speech signal.

8. A training method for a speech enhancement model, performed by an electronic device, the method comprising:

invoking the speech enhancement model based on a noisy speech feature of a noisy speech signal, to perform speech enhancement on the noisy speech signal, to obtain a plurality of first predicted mask values, the plurality of first predicted mask values having a one-to-one correspondence with a plurality of frequency bands in an auditory domain;

obtaining a first amplitude and a first phase corresponding to each frequency point of the noisy speech signal, and a second amplitude and a second phase corresponding to each frequency point of a clean speech signal;

determining a phase difference between the clean speech signal and the noisy speech signal at each frequency point based on the first phase and the second phase corresponding to each frequency point;

correcting the second amplitude corresponding to the frequency point based on the phase difference, to obtain a corrected second amplitude corresponding to each frequency point;

determining a loss value based on the plurality of first predicted mask values, and the first amplitude and the corrected second amplitude corresponding to each frequency point, including:

mapping the first amplitude and the corrected second amplitude corresponding to each frequency point to a frequency band corresponding to the auditory domain;

determining a first energy corresponding to each frequency band based on a first amplitude mapped to each frequency band, wherein the first energy is a weighted summation result of the following parameters: squares of first amplitudes mapped to each frequency band;

determining a second energy corresponding to each frequency band based on the corrected second amplitude mapped to each frequency band, the second energy being a weighted summation result of the following parameters: squares of corrected second amplitudes mapped to each frequency band; and determining the loss value based on the first predicted mask value, the first energy, and the second energy corresponding to each frequency band; and performing backpropagation in the speech enhancement model based on the loss value, to update parameters of the speech enhancement model.

9. The method according to claim 8, wherein the mapping the first amplitude and the corrected second amplitude that are corresponding to each frequency point to a frequency band corresponding to the auditory domain comprises:

determining a second frequency band to which each frequency point belongs in the auditory domain; and mapping the first amplitude and the corrected second amplitude corresponding to each frequency point to the second frequency band to which the frequency point belongs in the auditory domain.

10. The method according to claim 8, wherein the determining the loss value based on the first predicted mask value, the first energy, and the second energy corresponding to each frequency band further comprises:

determining a second target mask value corresponding to each frequency band based on the first energy and the second energy corresponding to each frequency band; and substituting the first predicted mask value corresponding to each frequency band and the second target mask value corresponding to the frequency band into a third target loss function for calculation, to obtain the loss value.

11. The method according to claim 10, wherein the determining a second target mask value corresponding to each frequency band based on the first energy and the second energy corresponding to each frequency band comprises:

determining the second target mask value corresponding to each frequency band in one of the following manners:

determining a ratio of the second energy to the first energy corresponding to the frequency band as the second target mask value corresponding to the frequency band; or determining a difference between the first energy and the second energy corresponding to the frequency band as third energy corresponding to the frequency band; and summing a square of the second energy and a square of the third energy corresponding to the frequency band, to obtain a first summation result; and determining a ratio of the square of the second energy to the first summation result as the second target mask value corresponding to the frequency band.

12. The method according to claim 8, wherein the determining the loss value based on the first predicted mask value, the first energy, and the second energy corresponding to each frequency band further comprises:

multiplying the first predicted mask value corresponding to each frequency band by the first energy corresponding to the frequency band, to obtain fourth energy corresponding to each frequency band; and substituting the second energy corresponding to each frequency band and the fourth energy corresponding to the frequency band into a fourth target loss function for calculation, to obtain the loss value.

13. A training apparatus for a speech enhancement model, the apparatus comprising:

an enhancement module, configured to invoke a speech enhancement model based on a noisy speech feature of a noisy speech signal, to perform speech enhancement, to obtain a plurality of first predicted mask values in an auditory domain, the plurality of first predicted mask values having a one-to-one correspondence with a plurality of frequency bands in the auditory domain;

an obtaining module, configured to obtain a first amplitude and a first phase corresponding to each frequency point of the noisy speech signal, and a second amplitude and a second phase corresponding to each frequency point of a clean speech signal;

a correction module, configured to determine a phase difference between the clean speech signal and the noisy speech signal at each frequency point based on the first phase and the second phase corresponding to each frequency point, and correct the second amplitude corresponding to the frequency point based on the phase difference at each frequency point, to obtain a corrected second amplitude corresponding to each frequency point;

a determining module, configured to determine a loss value based on the plurality of first predicted mask values, and the first amplitude and the corrected second amplitude corresponding to each frequency point, wherein determining the loss value includes:

mapping the plurality of first predicted mask values respectively to obtain second predicted mask values corresponding to each frequency point; and determining the loss value based on the second predicted mask value, the first amplitude, and the corrected second amplitude corresponding to each frequency point; and an update module, configured to perform backpropagation in the speech enhancement model based on the loss value to update parameters of the speech enhancement model.

14. The training apparatus of claim 13, wherein: the enhancement module is further configured to invoke the speech enhancement model with the updated parameters based on a to-be-processed speech feature of a to-be-processed speech signal, to perform speech enhancement, to obtain a plurality of third predicted mask values, the plurality of third predicted mask values having a one-to-one correspondence with the plurality of frequency bands in the auditory domain; and wherein the apparatus further comprises:

a mapping module, configured to perform mapping processing based on the plurality of mask values in the auditory domain, to obtain a mapping processing result; and a reconstruction module, configured to perform signal reconstruction based on the mapping processing result and a phase spectrum of the to-be-processed speech signal to obtain an enhanced speech signal.

15. The training apparatus of claim 13, wherein the mapping the plurality of first predicted mask values respectively to obtain second predicted mask values corresponding to each frequency point comprises:

determining the second predicted mask value corresponding to each frequency point in one of the following manners:

determining a first frequency band to which the frequency point belongs in the auditory domain, and determining a first predicted mask value corresponding to the first frequency band as the second predicted mask value corresponding to the frequency point; or determining the first frequency band to which the frequency point belongs in the auditory domain, and determining a reference frequency band adjacent to the first frequency band in the auditory domain; and performing weighted summation on the first predicted mask value corresponding to the first frequency band and a first predicted mask value corresponding to the reference frequency band, to obtain the second predicted mask value corresponding to the frequency point, a weight corresponding to each of the first predicted mask values being positively correlated with a distance between the following two elements: the frequency point and a center frequency point of a frequency band corresponding to the first predicted mask value.

16. The training apparatus of claim 13, wherein
the determining the loss value based on the second predicted mask value, the first amplitude, and the corrected second amplitude corresponding to each frequency point further comprises:
multiplying the second predicted mask value corresponding to each frequency point by the first amplitude corresponding to the frequency point, to obtain a third amplitude corresponding to each frequency point; and
substituting the third amplitude corresponding to each frequency point and the corrected second amplitude corresponding to the frequency point into a first target loss function for calculation, to obtain the loss value.

17. A non-transitory computer-readable storage medium, having executable instructions stored therein, the executable instructions, when executed by a processor, causing an apparatus to perform:
invoking a speech enhancement model based on a noisy speech feature of a noisy speech signal, to perform speech enhancement on the noisy speech signal, to obtain a plurality of first predicted mask values, the plurality of first predicted mask values having a one-to-one correspondence with a plurality of frequency bands in an auditory domain;
obtaining a first amplitude and a first phase corresponding to each frequency point of the noisy speech signal, and a second amplitude and a second phase corresponding to each frequency point of a clean speech signal;
determining a phase difference between the clean speech signal and the noisy speech signal at each frequency point based on the first phase and the second phase corresponding to each frequency point;
correcting the second amplitude corresponding to the frequency point based on the phase difference, to obtain a corrected second amplitude corresponding to each frequency point;
determining a loss value based on the plurality of first predicted mask values, and the first amplitude and the corrected second amplitude corresponding to each frequency point, including:

mapping the plurality of first predicted mask values respectively to obtain second predicted mask values corresponding to each frequency point; and
determining the loss value based on the second predicted mask value, the first amplitude, and the corrected second amplitude corresponding to each frequency point; and
performing backpropagation in the speech enhancement model based on the loss value, to update parameters of the speech enhancement model.

18. The non-transitory computer-readable storage medium of claim 17, wherein the apparatus is further caused to perform:
invoking the speech enhancement model with the updated parameters based on a to-be-processed speech feature of a to-be-processed speech signal, to perform speech enhancement, to obtain a plurality of third predicted mask values, the plurality of third predicted mask values having a one-to-one correspondence with the plurality of frequency bands in the auditory domain;
performing mapping processing based on the plurality of third predicted mask values to obtain a mapping processing result; and
performing signal reconstruction based on the mapping processing result and a phase spectrum of the to-be-processed speech signal, to obtain an enhanced speech signal.

19. The non-transitory computer-readable storage medium of claim 17, wherein
the determining the loss value based on the second predicted mask value, the first amplitude, and the corrected second amplitude corresponding to each frequency point further comprises:
multiplying the second predicted mask value corresponding to each frequency point by the first amplitude corresponding to the frequency point, to obtain a third amplitude corresponding to each frequency point; and
substituting the third amplitude corresponding to each frequency point and the corrected second amplitude corresponding to the frequency point into a first target loss function for calculation, to obtain the loss value.

* * * * *